United States Patent
Boguslavsky et al.

(10) Patent No.: US 9,340,448 B2
(45) Date of Patent: May 17, 2016

(54) COMPOSITIONS PROVIDING FROST APPEARANCE FOR PRINTING ON GLASS OR CERAMIC SUBSTRATES AND METHODS FOR THE USE THEREOF

(75) Inventors: Lior Boguslavsky, Petah-Tikva (IL);
Ariel Litwak, Ramat-Ha'Sharon (IL);
Michael Kheyfets, Jerusalem (IL)

(73) Assignee: DIP Tech Ltd., Kfar Saba (IL)

( * ) Notice: Subject to any disclaimer, the term of this patent is extended or adjusted under 35 U.S.C. 154(b) by 372 days.

(21) Appl. No.: 13/547,543

(22) Filed: Jul. 12, 2012

(65) Prior Publication Data

US 2013/0017388 A1    Jan. 17, 2013

Related U.S. Application Data

(60) Provisional application No. 61/507,622, filed on Jul. 14, 2011.

(51) Int. Cl.
*B05D 3/02* (2006.01)
*C03C 8/14* (2006.01)
*C09D 11/322* (2014.01)
*C09D 11/38* (2014.01)

(52) U.S. Cl.
CPC ............... *C03C 8/14* (2013.01); *C09D 11/322* (2013.01); *C09D 11/38* (2013.01); *C03C 2204/06* (2013.01); *Y10T 428/249969* (2015.04)

(58) Field of Classification Search
USPC ..................................................... 427/376.2
See application file for complete search history.

(56) References Cited

U.S. PATENT DOCUMENTS

| | | | |
|---|---|---|---|
| 2,102,630 A | | 12/1937 | Kreidl |
| 2,697,159 A | * | 12/1954 | Donahey .................. 428/386 |
| 4,080,188 A | * | 3/1978 | Doddato et al. ............ 65/31 |
| 5,821,184 A | * | 10/1998 | Haines et al. ............... 501/39 |
| 6,306,489 B1 | * | 10/2001 | Hellmann et al. ...... C03C 17/02 428/312.6 |
| 2008/0210122 A1 | * | 9/2008 | Magdassi et al. ......... 106/31.05 |

FOREIGN PATENT DOCUMENTS

| | | | |
|---|---|---|---|
| EP | 1 928 963 | | 6/2008 |
| JP | 56041857 | | 4/1981 |
| JP | 56041857 A | * | 4/1981 |
| WO | WO 2007/032977 | | 3/2007 |

* cited by examiner

*Primary Examiner* — Nathan Empie
(74) *Attorney, Agent, or Firm* — Pearl Cohen Zedek Latzer Baratz LLP

(57) ABSTRACT

A method of producing a substrate having a frosted appearance, an article having a frosted appearance and frost-imparting compositions are disclosed. The method includes applying a frost-imparting composition onto a ceramic substrate and firing the coated substrate above 400° C. to impart the frost appearance. The frost-imparting composition comprises a liquid vehicle, 20% to 90% by weight of glass frit particles and less than 10% by weight of at least one gas-releasing material, inactive below an activation temperature of at least 400° C. The gas releasing material may include carbonate, nitrate, iodate, bromate, chlorate, fluoride, manganate, dimanganate and sulfate compounds. The firing temperature is chosen to be above the activation temperature of the gas-releasing material, above which the gas-releasing material yields gas bubbles and above a temperature that causes the glass frit particles to behave as a viscous liquid.

9 Claims, No Drawings

COMPOSITIONS PROVIDING FROST APPEARANCE FOR PRINTING ON GLASS OR CERAMIC SUBSTRATES AND METHODS FOR THE USE THEREOF

CROSS REFERENCE TO RELATED APPLICATIONS

This application claims benefit of U.S. Provisional Application No. 61/507,622 filed on Jul. 14, 2012, entitled, "COMPOSITIONS PROVIDING FROST APPEARANCE FOR PRINTING ON GLASS OR CERAMIC SUBSTRATES AND METHODS FOR THE USE THEREOF", which is hereby incorporated by reference.

BACKGROUND

Ceramic materials are hard, brittle, heat-resistant and corrosion-resistant substrates made by shaping and then heating a non-metallic mineral, such as clay, at a high temperature. Enamels, porcelain, bricks, and glasses are examples of materials that are produced by molding or shaping minerals and baking or firing them at high temperatures.

Glass is a hard, brittle and often transparent solid that is used, for example, in the construction of windows, bottles and lenses. Many types of glass contain silica as their main component. Common types of glass include, inter-alia, soda-lime glass, borosilicate glass, boron and/or phosphorous doped glass, silicon dioxide, silicon nitride, and aluminum oxynitride.

In general, frosted glasses has the effect of rendering the glass translucent by scattering of light during transmission, thus blurring images view while still transmitting light.

Providing a non-colored pattern to glass or ceramic substrates may be used for example, in architecture, to give rough, opaque or "matt" patterns or may be used, for example, in surfaces on windows or glass doors both for aesthetic purposes and for avoiding accidental collisions.

A frost appearance of glass has traditionally been performed by physical (mechanical) or chemical etching processes.

In the physical process fine particles of sand are blasted against an unprotected portion of the surface to be decorated according to a mask. The sandblasting erodes the unmasked portion of the glass surface to produce a frosted appearance that provides a contrast for the untouched smooth transparent part of the glass. This process is tedious and costly.

Chemical etching comprises dipping or coating a glass or mask-covered glass in or with an etching composition containing strong acids such as hydrofluoric acid, nitric acid, hydrochloric acid, and sulfuric acid, creating a desired etched pattern. However, the strong acids used in conventional chemical etching processes cause a number of serious problems. Namely, during the etching step, poisonous gases, which are harmful to humans, are generated. Also, the waste water produced during such processes needs to be treated in a safe manner so as not to raise environmental pollution, including water pollution, air pollution and the like. Due to these problems, chemical etching has not been widely practiced in well developed nations on an industrial scale and thus, cannot fulfill increasing demands for frosted glass.

Several methods are available for decorating glass and ceramics with high-quality images. The coating and printing processes used for glass and ceramic printing rely on a variety of paste and ink systems. Some of these inks are inorganic.

Ceramic colors, as inorganic ceramic inks are known, are a mixture of mineral-based pigments (metal oxides and salts) and finely ground glass particles, called frit. These materials are fused to the ceramic substrate surface on which they are coated or printed by calcining ("firing") them at temperatures between 500-1450° C. Firing temperatures vary depending on the make-up of the color, the nature of substrate, and other application criteria. While these inks are typically called "inorganic", they may also contain small amounts of organic material. The organic components are the materials in which the pigment and frit are suspended to create a printing ink. These organic materials are expected to burn out during firing without affecting print quality and final color.

In some cases, screen printing, pad printing, offset printing, flexographic printing, gravure printing, roller coating, dip coating, curtain coating, air brushing, or other coating, spraying and analog printing techniques are (or can be) used to imitate a frost appearance on glass. These techniques require the preparing of plates, cylinders, masks or screens as a master copy, which must be maintained and stored, and then used to print the image on the glass or the ceramic substrate over and over again. The frost appearance in these coating and printing techniques can be achieved by using frost-imparting ink or pastes containing a combination of glass frits, in which a high melting frit is included, and/or ceramic (or inorganic) particles having an average particle size above several micron. Such ink paste products are also highly viscous, since they contain high concentration of the particles. After firing, a frosted appearance is produced by the high melting frits and/or the ceramic (or inorganic) particles remaining on the surface.

SUMMARY OF THE INVENTION

Embodiments of the inventions are directed to a method of producing a substrate having a frosted appearance, an article having a frosted appearance and frost-imparting compositions. The method includes applying a frost-imparting composition onto a ceramic substrate and firing the coated substrate above 400° C., usually in the range between 400° C. and 750° C. to impart the frost appearance. The frost-imparting composition may comprises a liquid vehicle, 20% to 90% by weight of glass frit particles and less than about 10% by weight of at least one gas releasing material, inactive below an activation temperature of at least 400° C. The gas releasing material may be any suitable material, as described herein, including for example carbonates, nitrates, iodates, bromates, clorates, fluorides, manganates, dimanganates and sulfates. The firing temperature is chosen to be above the activation temperature of the gas releasing material, above which the gas releasing material yields gas bubbles and above a temperature that causes the glass frit particles to behave as a viscous liquid.

The frost-imparting compositions may be suitable for inkjet printing, screen printing, pad printing, offset printing, flexographic printing, gravure printing, roller coating, dip coating, curtain coating and spraying. According to embodiments of the invention, the frost-imparting composition is an ink-jet composition, which is dispensed from an inkjet system.

The frosted fired article according to embodiments of the invention comprises ceramic substrate and a frost-imparting coating composition. Prior to firing, the frost-imparting composition comprises a liquid vehicle, 20% to 90% by weight of glass frit particles and less than 10% by weight of at least one gas releasing material, inactive below an activation temperature of at least 400° C., the gas releasing material comprised of carbonate, bicarbonate, nitrate, nitrite, iodate, periodate, bromate, perbromate, clorate, perchlorate, fluoride, manganate, dimanganate, permanganate, hypomanganate, chromate, dichromate, sulfate, sulfite, dithionite, thiosulfate, cyanate, thiocyanate compound or any combination thereof. After being fired at a firing temperature of above 400° C., wherein after being fired at a firing temperature of above 400° C., areas of the substrate that are exposed to the coating composition exhibits a frosted appearance, wherein the temperature is chosen to be above the activation temperature of the gas releasing material, above which the gas releasing material yields gas bubbles and above a temperature that causes the glass frit particles to behave as a viscous liquid.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention relate to a method for imparting a frosted appearance to a ceramic substrate or ceramic articles using a frost-imparting composition in liquid, slurry, suspension or paste form, frosting-imparting methods, printing processes, articles of manufacture comprising the frost-imparting composition and glass or ceramic substrates having a frost effect that is formed by using the ink, paste, suspension or paste frost-imparting composition and the methods described herein.

The frost appearance is obtained by proper selection of the composition, selected to suit the relevant application process such as printing or coating. The exact frost appearance can be controlled by the printing mode of the printer and the exact conditions of the firing process.

In some embodiments of the invention, a frost-imparting composition which may be in the form of an ink, slurry, suspension or a paste may include glass frit particles; a liquid vehicle and at least one gas-forming material or gas-releasing material, which releases carbon dioxide ($CO_2$), and/or water ($H_2O$), and/or nitrogen oxides (NO and/or $NO_2$), and/or oxygen ($O_2$), and/or nitrogen ($N_2$), and/or sulfur dioxide ($SO_2$), and/or iodine ($I_2$) and/or bromine ($Br_2$), and/or chlorine ($Cl_2$), and/or fluorine ($F_2$), and/or carbon monoxide (CO), and various combination thereof following decomposition or reaction with other materials. The terms "gas-forming material" and "gas-releasing material" are used inhere interchangeably. The composition may further include a fixation agent comprising an organic component. In some embodiments the frost imparting composition may include a pigment.

The gas-forming material/s is/are inactive when kept at storage and during the printing or coating stages and while kept below their activation temperature. The term "inactive" with respect to the gas-forming materials refers to the stage prior to decomposition or undergoing reaction that yields gas bubbles. These materials decompose or react upon firing above their activation temperature, which is above 400° C. to release one or more of the above mentioned gases.

In some embodiments of the invention, the frost-imparting composition includes at least one gas-releasing material in a form of micron and/or sub-micron particles. The gas releasing material may include carbonate, bicarbonate, nitrate, nitrite, iodate, periodate, bromate, perbromate, clorate, perchlorate, fluoride, manganate, dimanganate, permanganate, hypomanganate, chromate, dichromate, sulfate, sulfite, dithionite, thiosulfate, cyanate, thiocyanate compound or any combination thereof In some embodiments of the invention, the gas-releasing material solubility in the composition is less than 20%. In other embodiments of the invention, the gas-releasing material is an alkaline compound. In other embodiments of the invention, the gas-forming material is an alkaline earth metal compound. In other embodiments of the invention, the gas-forming material is a transition metal compound. In some embodiments of the invention, the gas-forming material is a post-transition metal compound.

Tables 1-10 provide non-exhaustive lists of exemplary compounds that may be used as a gas-releasing material in connection with embodiment of the invention.

TABLE 1

Carbonate salts and minerals (releasing carbon dioxide ($CO_2$) during thermal decomposition)

| Chemical name | Other names | Chemical formula (empirical) | Related compounds |
|---|---|---|---|
| Calcium carbonate | Limestone, calcite, aragonite, chalk, marble, Vaterite, Travertine, Tufa, Glendonite, Nicols, Manganocalcite - variety, Glendonite - pseudomorph | $CaCO_3$ | $CaCO_3 \cdot H_2O$ (Hydrated Calcium Carbonate; Monohydrocalcite), $CaCO_3 \cdot 6H_2O$ (Ikaite), shells of marine organisms, snails, pearls, eggshells, agricultural lime |
| Magnesium carbonate | Magnesite, Bitter spar, Hoshiite | $MgCO_3$ | $MgCO_3 \cdot H_2O$ (magnesium carbonate monohydrate), $MgCO_3 \cdot 2H_2O$ (magnesium carbonate dehydrate; Barringtonite), $MgCO_3 \cdot 3H_2O$ (magnesium carbonate trihydrate; Nesequehonite), $MgCO_3 \cdot 5H_2O$ (magnesium carbonate pentahydrate; Lansfordite), $Mg_2CO_3(OH)_2 \cdot 3H_2O$ (Hydrated magnesium carbonate hydroxide; artinite), $4MgCO_3 \cdot Mg(OH)_2 \cdot 5H_2O$ (dypingite), $Mg_5(CO_3)_4(OH)_2 \cdot 4H_2O$ (Hydromagnesite) |
| Strontium carbonate | Strontianite | $SrCO_3$ | |
| Barium carbonate | Witherite | $BaCO_3$ | |

TABLE 1-continued

Carbonate salts and minerals (releasing carbon dioxide ($CO_2$) during thermal decomposition)

| Chemical name | Other names | Chemical formula (empirical) | Related compounds |
|---|---|---|---|
| Sodium carbonate | Washing soda, Soda ash, Soda crystals, Sal Soda, Natrite | $Na_2CO_3$ | $Na_2CO_3 \cdot H_2O$ (sodium carbonate monohydrate), $Na_2CO_3 \cdot 10H_2O$ (sodium carbonate decahydrate; Natron), $Na_2(CO_3) \cdot H_2O$ (Hydrated sodium carbonate; Thermonatrite), $Na_3(HCO_3)(CO_3) \cdot 2H_2O$ (Hydrated sodium Bicarbonate Carbonate; Trona), $Na_5(CO_3)(HCO_3)_3$ (Sodium carbonate bicarbonate; Wegscheiderite) |
| Potassium carbonate | Potash, pearl ash | $K_2CO_3$ | |
| Lithium carbonate | Dilithium carbonate, Carbolith, Cibalith-S, Duralith, Eskalith, Lithane, Lithizine, Lithobid, Lithonate, Lithotabs Priadel, Zabuyelite | $Li_2CO_3$ | |
| Rubidium carbonate | | $Rb_2CO_3$ | |
| Cesium carbonate | Caesium carbonate | $Cs_2CO_3$ | |
| Beryllium carbonate | | $BeCO_3$ | $BeCO_3 \cdot 4H_2O$, $(BeO_5) \cdot CO_2 \cdot 5H_2O$ |
| Manganese carbonate | Rhodochrosite, Dialogite, Manganese spar | $MnCO_3$ | |
| Iron carbonate | Siderite, Chalybite, Iron spar, Spathose iron | $FeCO_3$ | |
| Cadmium carbonate | Otavite | $CdCO_3$ | |
| Zinc carbonate | Smithsonite, Zinc spar, Calamine, Galmei | $ZnCO_3$ | $Zn_5(CO_3)_2(OH)_6$ (Zinc carbonate hydroxide; Hydrozincite; zinc bloom) |
| Copper carbonate | Cupric carbonate | $CuCO_3$ | $Cu_3(OH)_2(CO_3)_2$ (Copper carbonate hydroxide; azurite), $Cu_2(OH)_2CO_3$ (Copper carbonate hydroxide; malachite) |
| Nickel carbonate | Nickelous carbonate | $NiCO_3$ | $Ni_4CO_3(OH)_6(H_2O)_4$ (basic nickel carbonate), $NiCO_3 \cdot 6H_2O$ (Nickel carbonate hexahydrate; Hellyerite), $Ni_2(CO_3)(OH)_2$ (Nickel carbonate hydroxide; Nullaginite) |
| Cobalt carbonate | Cobaltous carbonate, Spherocobaltite, Sphaerocobaltite | $CoCO_3$ | $CoCO_3(Co(OH)_x(H_2O)_y$ (basic cobalt carbonate), other cobalt carbonate hydroxides |
| Silver carbonate | | $Ag_2CO_3$ | |
| Lead carbonate | Cerussite | $PbCO_3$ | $2PbCO_3 \cdot Pb(OH)_2$ (White lead), $PbCO_3 \cdot PbO$ (Lead carbonate oxide; Shannonite), $3PbCO_3 \cdot Pb(OH)_2 \cdot PbO$, $PbCO_3 \cdot 2PbO$, $Pb_3(CO_3)_2(OH)_2$ (Lead carbonate hydroxide; Hydrocerussite), $Pb_{10}(CO_3)_6O(OH)_6$, (Lead carbonate oxide hydroxide; Plumbonacrite) |
| Aluminum carbonate | | $Al_2(CO_3)_3$ | Strontiodesserite |
| Thallium carbonate | Thallium monocarbonate | $Tl_2CO_3$ | |
| Lanthanum carbonate | | $La_2(CO_3)_3$ | $La_2(CO_3)_3 \cdot 8H_2O$ |
| Uranium carbonate | Uranyl carbonate, Rutherfordine | $UO_2CO_3$ | $UO_2CO_3 \cdot H_2O$, (Blatonite) |
| Yttrium carbonate | | $Y_2(CO_3)_3$ | $Y_2(CO_3)_3 \cdot xH_2O$ (Yttrium carbonate hydrate) |
| Chromium carbonate | | $Cr_2(CO_3)_3$ | |
| Cerium carbonate | | $Ce_2(CO_3)_3$ | $Ce_2(CO_3)_3 \cdot 5H_2O$ |
| Thorium carbonate | | $Th(CO_3)_2$ | |
| Praseodymium carbonate | | $Pr_2(CO_3)_3$ | $Pr_2(CO_3)_3 \cdot 8H_2O$ |
| Bismuth Carbonate | | $Bi_2(CO_3)_3$ | $(BiO)_2CO_3$ (Bismuth carbonate, basic; Bismuth Subcarbonate), $(BiO)_2CO_3 \cdot 5H_2O$ |

More carbonate minerals that can be used according to some embodiments of the invention are $CaMg(CO_3)_2$ (Calcium magnesium carbonate; Dolomite), $(Ni,Fe,Mg)CO_3$ (Nickel magnesium iron carbonate; Gaspeite), $Ca(Mn,Mg,Fe)(CO_3)_2$ (Calcium manganese magnesium iron carbonate; Ankerite; Kutnohorite; Kutnahorite; Kuzmenkoite), $CaZn(CO_3)_2$ (Calcium zinc carbonate; Minrecordite), $BaCa(CO_3)_2$ (Barium calcium carbonate; Barytocite; Alstonite; Bromlite; Paralstonite; Barytocalcite), $(Cu,Zn)_2CO_3(OH)_2$ (Copper zinc carbonate hydroxide; Rosasite), $(Zn,Cu)_5(CO_3)_2(OH)_6$ (Zinc copper carbonate hydroxide; Aurichalcite), $Pb_2Cl_2CO_3$ (Lead carbonate chloride; Phosgenite), $(Ce,La,Y)CO_3F$ (Cerium lanthanum yttrium carbonate fluoride; Bastnasite), $(Ba,Sr)_6(Ca,Mn)_6Mg(CO_3)_{13}$ (Barium strontium calcium manganese magnesium carbonate; Benstonite), $YBa_2Cu_3(OH)_xCO_3$ (Yttrium barium copper hydroxide carbonate), $CaAl_2(CO_3)_2(OH)_4 \cdot 3H_2O$ (Hydrated calcium aluminum carbonate hydroxide; Alumohydrocalcite), $CaAl_2(CO_3)_2(OH)_4 \cdot 6H_2O$ (Hydrated calcium aluminum carbonate hydroxide; Para-alumohydrocalcite), $Mg_6Cr_2(CO_3)(OH)_{16} \cdot 4H_2O$ (Hydrated magnesium chromium carbonate hydroxide; Barbertonite), $Na_7AlH_2(CO_3)_4F_4$ (Sodium aluminum carbonate hydroxide fluoride; Barentsite), $K_2Mg(CO_3)_2.4H_2O$ (Hydrated potassium magnesium carbonate; Baylissite), $(Ca,Pb)Bi_2(CO_3)_2O_2$ (Calcium lead bismuth carbonate oxide; Beyerite), $Bi_2(CO_3)O_2$ (Bismuth carbonate oxide; Bismutite), $Ca_2(CO_3)F_2$ (Calcium carbonate fluoride; Brenkite), $Mg_6Fe(CO_3)(OH)_{13}.4H_2O$ (Hydrated magnesium iron carbonate hydroxide; Brugnatellite), $K_2Ca(CO_3)_2$ (Potassium calcium carbonate; Butschliite), $Mg_6Cr_2CO_3(OH)_{16}.4H_2O$ (Hydrated magnesium chromium carbonate hydroxide; Stichtite), $Fe_4Al_2(OH)_{12}CO_3.3H_2O$ (Hydrated iron aluminum carbonate hydroxide; Caresite), $Na_2Cu(CO_3)_2.3H_2O$ (Hydrated sodium copper carbonate; Chalconatronite), $Mn_4Al_2(CO_3)(OH)_{12}.3H_2O$ (Hydrated manganese aluminum carbonate hydroxide; Charmarite), $NaAl(CO_3)(OH)_2$ (Sodium aluminum carbonate hydroxide; Dawsonite), $CaMg_3(CO_3)_4$ (Calcium magnesium carbonate; Huntite), $BaMg(CO_3)_2$ (Barium magnesium carbonate; Norsethite), $PbAl_2(CO_3)_2(OH)_4.(H_2O)$ (Hydrated lead aluminum carbonate hydroxide; Dundasite), $Na_2Mg(CO_3)_2$ (Sodium magnesium carbonate; Eitelite), $K_2Ca(CO_3)_2$ (Potassium calcium carbonate; Fairchildite), $Cu_5(CO_3)_3(OH)_4.6H_2O$ (Hydrated copper carbonate hydroxide; Georgeite), $Mg_6Al_2(CO_3)(OH)_{16}.4H_2O$ (Hydrated magnesium aluminum carbonate hydroxide; Hydrotalcite), $Mg_2Al_2(CO_3)_4(OH)_2.15H_2O$ (Hydrated magnesium aluminum carbonate hydroxide; Indigirite), $BaAl_2(CO_3)_2(OH)_4.H_2O$ (Hydrated barium aluminum carbonate hydroxide; Dresserite; Hydrodresserite), $NaNi_4(CO_3)(OH)_3.3H_2O$ (Hydrated sodium nickel carbonate hydroxide; Kambaldaite), $CaBi(CO_3)OF$ (Calcium bismuth carbonate oxide fluoride; Kettnerite), $(Mn,Zn)_7(CO_3)_2(OH)_{10}$ (Manganese zinc carbonate hydroxide; Loseyite), $Pb_4SO_4(CO_3)_2(OH)_2$ (Lead sulfate carbonate hydroxide; macphersonite), $Mg6Al2(CO3)(OH)16.4H2O$ (Hydrated magnesium aluminum carbonate hydroxide; Manasseite), $Na_2Ca(CO_3)_2$ (Sodium calcium carbonate; Natrofairchildite; Nyerereite), $Na_2Ca(CO_3)_2.5H_2O$ (Hydrated sodium calcium carbonate; Gaylussite), $Na_2Ca_2(CO_3)_3$, (Sodium calcium carbonate; Shortite), $Na_2Ca(CO_3)_2.2H_2O$ (Hydrated sodium calcium carbonate; Pirssonite), $NaCa_3(CO_3)_2F_3.H_2O$ (Hydrated sodium calcium carbonate fluoride; Sheldrickite), $Na_3Mg(CO_3)_2Cl$ (Sodium magnesium carbonate chloride; Northupite), $(Sr,Ca,Ba)(CO_3)_2$ (Strontium calcium barium carbonate; Olekminskite), $Mg_2(CO_3)(OH)_2.0.5H_2O$ (Hydrated magnesium carbonate hydroxide; Pokrovskite), $Mg_6Fe_2(CO_3)(OH)_{16}.4H_2O$ (Hydrated magnesium iron carbonate hydroxide; Pyroaurite), $Mg_4Al_2(OH)_{12}CO_3.4H_2O$ (Hydrated magnesium aluminum carbonate hydroxide; Quintinite), $(Cu,Ni)_2(CO_3)(OH)_2$ (Copper nickel carbonate hydroxide; Glaukosphaerite; Glaukospherite), $(Cu,Co)_2CO_3(OH)_2$ (Copper cobalt carbonate hydroxide; Kolwezite), $(Mg,Cu)_2(CO_3)(OH)_2$ (Magnesium copper carbonate hydroxide; Mcguinnessite), $(Zn,Cu)_2(CO_3)(OH)_2$ (Zinc copper carbonate hydroxide; Zincrosasite), $Na_3(Ca,Mn)_2(CO_3)_3F$ (Sodium calcium manganese carbonate fluoride hydroxide; Rouvilleite), $(Na,Ca)_4Zr_2Ti(CO_3)_4O_4$ (Sodium calcium zirconium titanium carbonate oxide; Sabinaite), $(Zn,Mg,Mn)_4Zn_3(CO_3)_2(OH)_{10}$ (Zinc magnesium manganese carbonate hydroxide; Sclarite), $Ca_2Mg_{11}(CO_3)_9(HCO_3)_4(OH)_4.6H_2O$ (Hydrated calcium magnesium carbonate Bicarbonate Hydroxide; Sergeevite), $Mg_6Fe_2CO_3(OH)_{16}.4H_2O$ (Hydrated magnesium iron carbonate hydroxide; Sjogrenite), $(Sr,Ca)Al_2(CO_3)_2(OH)_4.H_2O$ (Hydrated strontium calcium aluminum carbonate hydroxide; Strontiodresserite), $Pb_4SO_4(CO_3)_2(OH)_2$ (Lead sulfate carbonate hydroxide; Leadhillite; Susannite), $NaPb_2(OH)(CO_3)_2$ (Sodium lead carbonate hydroxide), $Hg_{16}(Ni,Mg)_6(H_3O)_8(CO_3)_{12}.3H_2O$ (Hydrated mercury nickel magnesium carbonate oxide hydroxide; Szymanskiite), $NaCa_2Al_4(CO_3)_4(OH)_8Cl$ (Sodium calcium aluminum carbonate hydroxide chloride; Tunisite), $Na_6Mg_2(CO_3)_4SO_4$ (Sodium magnesium carbonate sulfate; Tychite), $Na_2(Sr,Ca)_3Zr(CO_3)_6.3H_2O$ (Hydrated sodium strontium calcium zirconium carbonate; Weloganite), $Ni_3(CO_3)(OH)_4.4H_2O$ (Hydrated nickel carbonate hydroxide; Zaratite), $(Na,K)_2Ca(CO_3)_2$ (Sodium potassium calcium carbonate; Zemkorite), $Mn_{26}As_{18}O_{50}(OH)_4CO_3$ (Armangite), $K_5Na_5(Ce,Ca)_{12}Si_{28}O_{70}(OH)_2(CO_3)_8.8H_2O$ (Ashcroftine-(Ce)), $K_5Na_5(Y,Ca)_{12}Si_{28}O_{70}(OH)_2(CO_3)_8.8H_2O$ (Ashcroftine-(Y)), $Pb_4(CO_3)Cl_6.H_2O$ (Barstowite), $Ce_2Fe(CO_3)(Si_2O_7)$ (Biraite-(Ce)), $Na_3Fe(PO_4)(CO_3)$ (Bonshtedtite), $Ca_4MgB_4O_6(OH)_6(CO_3)_2$ (Borcarite), $Na_3Mg(PO_4)(CO_3)$ (Bradleyite), $Zn_3(CO_3,SO_4)(OH)_4$ (Brianyoungite), $Pb_{7+x}Mg_{4.5}[(Si,Al)_5O_{14}](BO_3)(BO_3,AsO_4)(CO_3)(OH,O)_7$ (x<0.5) (Britvinite), $Na_6(CO_3)(SO_4)_2$ (Burkeite), $Na_2(Ba,Sr)_2(Fe,Mn)TiSi_2O_7(CO_3)(OH)_3F$ (Bussenite), $Na_3(Ca,REE,Sr)_3(CO_3)_5$ (Calcioburbankite), were REE is for any rare earth element like scandium, yttrium, lanthanum, cerium, praseodymium, neodymium, promethium, samarium, europium, gadolinium, terbium, dysprosium, holmium, erbium, thulium, ytterbium, or lutetium), $Pb_5Cu_2(CO_3)(SO_4)_3(OH)_6$ (Caledonite), $Cu_2Mg_2(CO_3)(OH)_6.2H_2O$ (Callaghanite), $Cu_4Al_2[HSbO_4,SO_4](OH)10(CO_3).2H_2O$ (Camerolaite), $Mg_2(CO_3)(HBO_3).5H_2O$ (Canavesite), $Na_6Ca_2Al_6Si_6O_{24}(CO_3)_2$ (Cancrinite), $Ca_2Mg(CO_3)_2B_2(OH)_8.4H_2O$ (Carboborite), $Ca_5(PO_4,CO_3)_3F$ (Carbonate-fluorapatite), $Ca_5(PO_4,CO_3)_3(OH)$ (Carbonate-hydroxylapatite), $Cu_4Al_2(CO_3,SO_4)(OH)_{12}.2H_2O$ (Carbonatecyanotrichite), $KNa_4Ca_4Si_8O_{18}(CO_3)_4(OH,F).H_2O$ (Carletonite), $Ca_3Ge(OH)_6(SO_4)(CO_3).12H_2O$ (Carraraite), $(Ni,Cu)_{14}Al_9(SO_4,CO_3)_6(OH)_{43}.7H_2O$, (Carrboydite), $Y_2(Ca,Gd)_2Si_4O_{10}(CO_3)_3(H_2O,O,OH).3H_2O$ (Caysichite-(Y)), $Ca,Mg)_3Si(OH)_6(SO_4,CO_3)_2.9H_2O$, (Chelyabinskite), $Mg_2(CO_3)Cl(OH).3H_2O$ (Chlorartinite), $(Mg,Fe)_4Al_2(OH)_{12}(Cl_2,CO_3).2H_2O$ (Chlormagaluminite), $Fe_2(CO_3)(OH)_2$, (Chukanovite), $(Cu,Zn)_3(CO_3)(OH)_4.4H_2O$ (Claraite), $Hg_3(CO_3)(OH).2H_2O$ (Clearcreekite), $Mg_{10}Fe_2(CO_3)(OH)_{24}.2H_2O$ (Coalingite), $Ni_6Co_2(CO_3)(OH)_{16}.4H_2O$ (Comblainite), $Na_3Sr(PO_4)(CO_3)$ (Crawfordite), $(Sr,Ca,Ba)_3(Ce,La)(PO_4)(CO_3)_{3-x}(OH,F)_x$ (Daqingshanite-(Ce)), $(Y,REE)_4Cu(CO_3)_4Cl(OH)_5.2H_2O$ (Decrespignyite-(Y)), $Ca_6(CO_3)_{2-x}(SiO_4)_x(OH)_7(Cl,OH)_{1-2x}$ (x=0,5) (Defernite), $Mg_6Mn_2(CO_3)(OH)_{16}.4H_2O$ (Desautelsite), $Co_3(AsO_4)_2.8H_2O$ (Erythrite), $Ba_6Fe_3Si_8O_{23}(CO_3)_2Cl_3.H_2O$ (Fencooperite), $(Pb,Cu)_{2-3}(CO3)_{1.5-2}(OH,F)_{0.5-1}[(Fe,Al)_2Si_4O_{10}(OH)_2].nH_2O$ (Ferrisurite), $Na_6Fe_2(SO_4)(CO_3)_4$ (Ferrotychite), $Ca_4Si_2O_6(CO_3)(OH,F)_2$ (Fukalite), $Ca(REE)_2(CO_3)_4.H_2O$ (Galgenbergite-(Ce)), $Pb(Cu,Fe)_2(AsO_4,SO_4)_2(CO_3,H_2O)_{0.7}$ (Gartrellite), $Ca_4Mn_{3-x}(BO_3)_3(CO_3)(O,OH)_3$ (Gaudefroyite), $Mg_5(CO_3)_4(OH)_2.5H_2O$ (Giorgiosite), $NaCa_2Mg_3(PO_4)_2[PO_2(OH)_2](CO_3)(OH)_2.4H_2O$ (Girvasite), $(Na,Ca)_{10}Ca_9(Fe,Fe)_2Zr_3NbSi_{25}O_{72}(CO_3)(OH)_3.H_2O$ (Golyshevite), $(Na_2,K_2,Ca)CO_3$ (Gregoryite), $KNa_{22}(SO_4)_9(CO_3)_2Cl$ (Hanksite), $Ca_{24}Mg_8Al_2(SiO_4)_8(BO_3)_6(CO_3)_{10}.2H_2O$ (Harkerite), $(Mg,Mn)_{24}Zn_{18}Fe_3(SO_4)_4(CO_3)_2(OH)_{81}$ (Hauckite), $CaMg_5(PO_4)_3(CO_3)(OH)$ (Heneuite), $Mn_6(CO_3)_2(OH)_7(Cl,OH)$ (Holdawayite), $Mg_{12}(PO_3OH,CO_3)(PO_4)_5(OH,O)_6$ (Holtedahlite), $Al_{14}(CO_3)_3(OH)_{36}.nH_2O$ (Hydroscarbroite), $Ce(CO_3)(OH)$ (Hydroxylbastnasite-(Ce)), $La(CO_3)(OH)$ (Hydroxylbastnasite-(La)), $Nd(CO_3)(OH)$ (Hydroxylbastnasite-(Nd)), $Y_2(SiO_4)(CO_3)$ (Iimoriite-(Y)), $(Na,K)_6Ca_2(Si_6Al_6O_{24})Cl_2(CO_3)$, $Na_3Y(CO_3)_3.6H_2O$, $[Ba_6(PO_4)_2(CO_3)][Fe_7(OH)_4Fe_2O_2(SiO_3)_8]$, $NaCe_2(CO_3)_2[(CO_3)_{1-x}F_{2x}]F$, $Na_{12}(Ce,REE,Sr)_3Ca_6Mn_3Zr_3W(Si_{25}O_{73})(CO_3)(OH,Cl)_2$ (Johnsenite-(Ce)), $Ca_3Mn(SO_4,CO_3)_2(OH)_6.12H_2O$ (Jouraykskite), $Na_2Cu(CO_3)_2$ (Juangodoyite), $Ca_2(Y,Ce)_2Si_4O_{12}(CO_3).H_2O$ (Kainosite-(Y)), $(Y,Nd,Gd)_2U_4(CO_3)_3 O_{12}.14.5H_2O$ (Kamotoite-(Y)), $Ba_{12}(Si_{11}Al_5)O_{31}(CO_3)_8Cl_5$ (Kampfite), $(Ca_{1.84}REE_x)(Y_{1.46}REE_{0.54-x})(CO_3)_4 (OH)_{1.65}. 2H_2O$ (Kamphaugite-(Y)), $[Mg_{18}Al_9(OH)_{54}][Sr_2(CO_3,PO_4)_9(H_2O,H_3O)_{11}]$ (Karchevskyite), $Pb_8Al_4Si_8O_{20}(SO_4)_2(CO_3)_4(OH)_8$ (Kegelite), $Ta(OH)_3(O,CO_3)$ (Kimrobinsonite), $CaAl_2(CO_3)_2(OH)_4.H_2O$ (Kochsandorite), $Mg_5(PO_4)_2(CO_3)(OH)_2.4.5H_2O$ (Kovdorskite), $La(CO_3)(OH)$ (Kozoite-(La)), $(Nd,La,Sm,Pr)(CO_3)(OH)$ (Kozoite-(Nd)), $Ba(Al,Mg)(PO_4,CO_3)(OH)_2.H_2O$ (Krasnovite), $Ba_2Ce(CO_3)_3F$ (Kukharenkoite-(Ce)), $Ba_2(La,Ce)(CO_3)_3F$ (Kukharenkoite-(La)), $CaGd_2(UO_3)_{24}(CO_3)_8(SiO_4)_4O_4.60H_2O$ (Lepersonnite-(Gd)), $(Ca,Na,K)_8(Si,Al)_{12}O_{24}[(SO_4),(CO_3),Cl,OH]_4.H_2O$ (Liottite), $Na_3Ce_2(CO_3)_4F$ (Lukechangite-(Ce)), $NaBa_3CaY(CO_3)_3(OH)_6.3H_2O$ (Mackelveyite-(Y)), $Na_6(Mn,Fe,Mg)_2(SO_4)(CO_3)_4$ (Manganotychite), $Ca_4Al_6Si_6O_{24}CO_3$ (Meionite; Wernerite), $(Ca,Y)_3 Al[PO_3OH,CO_3](CO_3)(OH)_6.12H_2O$ (Micheelsenite), $Na_{25}Ba(Y,Gd,Dy)_2(HCO_3)_4(CO_3)_{11}(SO_4)_2ClF_2$ (Mineevite-(Y)), $Na_9(Ca,Na)_6Ca_6Fe_2Zr_3[ ]Si_{25}O_{72}(CO_3)(OH)_4$ (Mogovidite), $Sr_4Al_8(CO_3)_3(OH,F)_{26}.10-11H_2O$ (Montroyalite), $Hg_2N(Cl,SO_4,MoO_4,CO_3).H_2O$ (Mosesite), $Na_2Mg_{38}Al_{24}(CO_3)_{13}(SO_4)_8(OH)_{108}.56H_2O$ (Motukoreaite), $(Mg,Ni)_{11}(Fe,Cr)_3(SO_4,CO_3)_{3.5}(OH)_{24}.11H_2O$ (Mountkeithite), $YB(OH)_4(CO_3)$ (Moydite-(Y)), $CaTe(CO_3)O_2$ (Mroseite), $(Mn,Ni,Cu)_8(SO_4)_4(CO_3)(OH)_6.48H_2O$ (Nakauriite), $PbMn_3Al_4(CO_3)_4(SO_4)O_5.5H_2O$ (Nasledovite), $[Ba,Ca)_2(Al,Si)_7O_{10}(CO_3)(OH)_6.nH_2O$ (Niksergievite), $NaBe(CO_3)(OH).2H_2O$ (Niveolanite), $Ca_4CuB_4O_6(OH)_6(CO_3)_2$ (Numanoite), $Ni_2(CO_3)(OH)_2.H_2O$ (Otwayite), $Co_3(PO_4)_2. 8H_2O$ (Pakhomovskyite), $Ni(OH)_{2-x}(SO_4,CO_3)_{0.5x}$ (Paraotwayite), $Ca_5(SiO_4)_2(CO_3)$ (Paraspurrite), $La_3(Ca,Sr)_2NaCu(CO_3)_8$ (Paratooite-(La)), $(Na,K)(Mg,Ca)_4Al_8(PO_4)_8(CO_3)(OH)_7.30H_2O$ (Parwanite), $Hg_3(CO_3)(OH).2H_2O$ (Peterbaylissite), $(Na,Ca)_4(Ce,La,Nd)_2(CO_3)_5$ (Petersenite-(Ce)), $PbCr_2(CO_3)_2(OH)_4.H_2O$ (Petterdite), $Pb_{12}O_6Mn(Mg,Mn)_2(Mn,Mg)_4(SO_4)(CO_3)_4Cl_4(OH)_{12}$ (Philolithite), $Mg14(PO_4)_6(PO_3OH,CO_3)_2(OH)_6$ (Phosphoellenbergerite), $BaCa_2(CO_3)_2F_2$ (Podlesnoite), $Ba(Ce,REE)(CO_3)_2F$ (Qaqarssukite-(Ce)), $NaH_4(CO_3)(BO_3).2H_2O$ (Qilianshanite), $Ca_2(SO_4)(CO_3).4H_2O$ (Rapidcreekite), $Ni_6Fe_2(CO_3)(OH)_{16}.4H_2O$ (Reevesite), $Ca_3Si_3O_8[(OH)_{2-4x},(CO_3)_x]$ (Rosenhahnite), $(Na,Ca,K)_9Si_6Al_6O_{24}[(OH),(SO_4),(CO_3),Cl]_4.nH_2O$ (Sacrofanite), $Ca_2Mn_3O_2(AsO_4)_2(CO_3).3H_2O$ (Sailaufite), $Ca_3Mg(BO_3)_2(CO_3).0.36H_2O$ (Sakhaite), $Na_2CaPb_3(CO_3)_5$ (Sanromanite), $Al_5(CO_3)(OH)_{13}.5H_2O$ (Scarbroite), $Ca_7Si_6(CO_3)O_{18}.2H_2O$ (Scawtite), $(Cu,Zn)_7(SO_4,CO_3)_2(OH)_{10}.3H_2O$ (Schulenbergite), $Na_3Mn(PO4)(CO_3)$ (Sidorenkite), $(Ca,Na)_4Al_6Si_6O_{24}(SO_4,CO_3)$ (Silvialite), $Ca_3Zn_2(PO_4)_2CO_3(OH)_2.H_2O$ (Skorpionite), $Ca_5(SiO_4)_2(CO_3)$ (Spurrite), $(Sr,Ba,Na)_2Al(CO_3)F_5$ (Stenonite), $(Pb,Cu)_{2-3}(CO3)_{1.5-2}(OH,F)_{0.5-1}[(Al,Fe)_2(Si,Al)_4O_{10}(OH)_2].nH_2O$ (Surite), $Ni_6Al_2(OH)_{16}(CO_3,OH).4H_2O$ (Takovite), $Ca_6Mg_2(SO_4)_2(CO_3)_2Cl_4(OH)_4.7H_2O$ (Tatarskite), $Ca_3Si(CO_3)(SO_4)(OH)_6.12H_2O$ (Thaumasite), $Ca_5Si_2O_7(CO_3)_2$ (Tilleyite), $K(Ca,Na)_6(Si,Al)_{10}O_{22}(SO_4,CO_3,(OH)_2).H_2O$ (Tuscanite), $CaCu_5(AsO_4)_2(CO_3)(OH)_4. 6H_2O$ (Tyrolite), $(Hg_2)_{10}O_6I_3Cl(CO_3)$ (Vasilyevite), $(Na,Ca,K)_6(Si,Al)_{12}O_{24}[(SO_4),(CO_3),Cl_2]2-4.nH_2O$ (Vishnevite), $Na_2Zr(PO4)(CO3)(OH).2H_2O$ (Voggite), $(Ni,Mg)_5(CO_3)_4(OH)_2.4-5H_2O$ (Widgiemoolthalite), $Zn_4Al_2(OH)_{12}(CO_3).3H_2O$ (Zaccagnaite), $(Na,[?])_{11-12}(Na,Ce)_3Ca_6Mn_3Zr_3Nb(Si_{25}O_{73})(OH)_3(CO_3).H_2O$ (Zirsilite-(Ce); Carbokentbrooksite), $(Zn,Cu)_7(SO_4,CO_3)_2 (OH)_{10}.3H_2O$ (Zn-Schulenbergite), $(Ca,Mn)CO_3$ (Parakutnohorite), $Ba_2Ce(CO_3)_3F$ (Barium cerium carbonate fluoride; Zhonghuacerite-(Ce)), $Ca(UO_2)_3(CO_3)(OH)_6.3H_2O$ (Urancalcarite), $Na_2Ca(UO_2)(CO_3)_3.5-6H_2O$ (hydrated sodium calcium uranyl carbonate; Andersonite; Andersonit; Andersonita), $Ca_3U(UO_2)_6(CO_3)_2(OH)_{18}.3-5H_2O$ (Yttrium barium copper hydroxy carbonate; Wyartite), $Na_4(UO_2)(CO_3)$ (Cejkaite), $(UO_2)_2CO_3(OH)_2.4H_2O$ (Oswaldpeetersite), $NaCa_3(UO_2)(CO_3)_3(SO_4)F.10H_2O$ (Schrockingerite), $Cu_2(Ce,Nd,La)_2(UO_2)(CO_3)_5(OH)_2.1.5H_2O$ (Hydrated copper cerium neodymium lanthanum uranyl carbonate hydroxide; Astrocyanite-(Ce)), $Mg_2(UO_2)_2(CO_3)_3.18H_2O$ (Hydrated magnesium uranyl carbonate; Bayleyite), $(Y,REE)_8(H_2O)_{25}(UO_2)_{16} O_8(OH)_8(CO_3)_{16}.14H_2O$ (Hydrated yttrium REE uranyl carbonate hydroxide; Bijvoetite-(Y)), $Ca[(UO_2)_3(CO_3)_2O_2]. 6H_2O$ (Hydrated calcium uranyl carbonate; Fontanite), $K_3Na(UO_2)(CO_3)_3.H_2O$ (Hydrated potassium sodium uranyl carbonate; Grimselite), $(UO_2)(CO_3).2H_2O$ (Hydrated uranyl carbonate; Joliotite), $Ca_2(UO_2)(CO_3)_3.11H_2O$ (Hydrated calcium uranyl carbonate; Liebigite), $Ca(UO_2)(CO_3)_2.3H_2O$ (Hydrated calcium uranyl carbonate; Metazellerite), $Ca_3Mg_3(UO_2)_2(CO_3)_6(OH)_4.18H_2O$ (Hydrated calcium magnesium uranyl carbonate hydroxide; Rabbittite), $Cu_2(UO_2)_3(CO_3)_2 O_2(OH)_2. 4H_2O$ (Hydrated copper uranyl carbonate oxide hydroxide; Roubaultite), $NaCa_3(UO_2)(CO_3)_3(SO_4)F.10H_2O$ (Hydrated sodium calcium uranyl sulfate carbonate fluoride; Schrokingerite; Schrockingerite), $Ca(Nd,REE)_2(UO_2)(CO_3)_4 (OH)_2.6H_2O$, Shabaite-(Nd) (Hydrated calcium neodymium REE uranyl carbonate hydroxide), $Ca(UO_2)_6(CO_3)_5(OH)_4.6H_2O$ (Hydrated calcium uranyl carbonate hydroxide; Sharpite), $A_4(UO_2)(CO_3)_3.nH_2O$ (A=Li, Na, K, $NH_4$), $CaMg(UO_2)(CO_3)_3.12H_2O$ (Hydrated calcium magnesium uranyl carbonate; Swartzite), $Ca_2Cu(UO_2)(CO_3)_4. 6H_2O$ (Hydrated calcium copper uranyl carbonate; Voglite), $Pb_2(UO_2)(CO_3)_3$ (Lead uranyl carbonate; Widenmannite), $Ca(UO_2)(CO_3)_2.5H_2O$ (Hydrated calcium uranyl carbonate; Zellerite), $CaZn_{11}(UO_2)(CO_3)_3(OH)_{20}.4H_2O$ (Hydrated calcium zinc uranyl carbonate hydroxide; Znucalite), $Sr(Ce,La)(CO_3)_2(OH).H_2O$ (Hydrated strontium cerium lanthanum carbonate hydroxide; Ancylite-(Ce), or Ancylite-(La)), $BaNaCe_2(CO_3)_4F$ (Sodium barium cerium carbonate Fluoride; Baiyuneboite-(Ce)), $(La,Ce,Y)(CO_3)F$ (Lanthanum cerium yttrium carbonate fluoride; Bastnasite-(La Bastnasite-(Ce), or Bastnasite-(Y)), $(Na,Ca)_3(Sr,Ba,Ce)_3(CO_3)_5$ (Sodium calcium strontium barium cerium carbonate; Burbankite), $Ca(Ce,Nd,Sr)(CO_3)_2(OH).H_2O$ (Hydrated calcium cerium neodymium strontium carbonate hydroxide; Calcioancylite), $(Ce,La)_2(CO_3)_3.4H_2O$ (Hydrated cerium lanthanum carbonate; Calkinsite-(Ce)), $(Ca,Na)(Sr,Ce,Ba)(CO_3)_2$ (Calcium sodium strontium cerium barium carbonate; Carbocernaite), $Ba_3Ce_2(CO_3)_5F_2$ (Barium cerium carbonate fluoride; Cebaite-(Ce)), $Ba_3(Nd,Ce)_2(CO_3)_5F_2$ (Barium neodymium cerium carbonate fluoride; Cebaite-(Nd)), $Ba(Ce,La)_2(CO_3)_3 F_2$ (Barium cerium lanthanum carbonate fluoride; Cordylite-(Ce)), $(Sr,Ca,Ba)_3(Ce,La)(PO_4)(CO_3)_{3-x}(OH,F)_x$ (Strontium calcium barium cerium lanthanum phosphate carbonate hydroxide fluoride; Daqingshanite-(Ce)), $Sr_3NaCaY(CO_3)_6.3(H_2O)$ (Hydrated strontium sodium calcium yttrium carbonate; Donnayite-(Y)), $(Ba,Sr)(Ca,Na,K,Y,Ce)(CO_3)_2$ (Barium strontium calcium sodium potassium yttrium cerium carbonate; Ewaldite), $Pb(Nd,La)(CO_3)_2(OH).H_2O$, Gysinite-(Nd) (Hydrated lead neodymium lanthanum carbonate hydroxide), $NaY(CO_3)F_2$ (Sodium yttrium carbonate fluoride; Horvathite-(Y)), BaCe(CO$_3$)$_2$F (Barium cerium carbonate fluoride; Huanghoite-(Ce)), (Ce, La, Nd)CO$_3$(OH, F) (Cerium lanthanum neodymium carbonate hydroxide fluoride; Hydroxylbasnasite), (Ce, La, Nd)CO$_3$OH (Cerium lanthanum neodymium carbonate hydroxide; Hydroxylcarbonate-(Nd)), (NaCa)$_3$(Ba,Sr,Ce,Ca)$_3$(CO$_3$)$_5$ (Sodium calcium barium strontium cerium carbonate; Khanneshite), CaY$_2$(CO$_3$)$_4$.6H$_2$O (Hydrated calcium yttrium carbonate; Kimuraite-(Y)), (Ce,La,Nd)$_2$(CO$_3$)$_3$.8H$_2$O (Hydrated cerium lanthanum neodymium carbonate; Lanthanite; Neodymite), CaY$_4$(CO$_3$)$_7$.9H$_2$O (Hydrated calcium yttrium carbonate; Lokkaite-(Y)), Ba$_3$Na(Ca,U)Y(CO$_3$)$_6$.3H$_2$O (Hydrated barium sodium calcium uranium yttrium carbonate; Mckelveyite), (Ba,Sr)(Ca,Na,Nd,REE)(CO$_3$)$_2$.3–10H$_2$O (Mckelveyite-(Nd)), NaCa(Ba,Sr)$_3$(Y,REE)(CO$_3$)$_6$.3H$_2$O (Mckelveyite-(Y)), Ca(Ce,La)$_2$(CO$_3$)$_3$F$_2$ (Calcium cerium lanthanum carbonate fluoride; Parisite-(Ce)), Ca(Nd,Ce,La)$_2$(CO$_3$)$_3$F$_2$ (Calcium neodymium cerium lanthanum carbonate fluoride; Parisite-(Nd)), (Na,Mn,Fe)$_{15}$(Y,REE)$_2$(CO$_3$)$_9$(SO$_3$F)Cl (Reederite-(Y)), Na$_3$(Ce,La,Ca,Na,Sr)$_3$(CO$_3$)$_5$ (Sodium cerium lanthanum calcium strontium carbonate; Remondite-(Ce)), Na$_3$(La,Ce,Ca)$_3$(CO$_3$)$_5$ (Remondite-(La)), Ca$_2$(Ce,La)$_3$(CO$_3$)$_5$F$_3$ (Calcium cerium lanthanum carbonate fluoride; Rontgenite-(Ce)), (Mg,Fe)(Ce,La,Nd)$_2$(CO$_3$)$_4$ (Magnesium iron cerium lanthanum neodymium carbonate; Sahamalite), PbCu(Nd,Gd,Sm,Y)(CO$_3$)$_3$(OH).1.5H$_2$O (Hydrated lead copper neodymium gadolinium samarium yttrium carbonate hydroxide; Schuilingite-(Nd)), Na$_3$Y(CO$_3$)$_3$.3H$_2$O (Hydrated sodium yttrium carbonate; Shomiokite-(Y)), CaCe(CO$_3$)$_2$F (Calcium cerium carbonate fluoride; Synchysite-(Ce)), CaNd(CO$_3$)$_2$F (Calcium neodymium carbonate fluoride; Synchysite-(Nd)), CaY(CO$_3$)$_2$F (Calcium yttrium carbonate fluoride; Synchysite-(Y)), Y$_2$(CO$_3$)$_3$.2–3H2O (Hydrated yttrium carbonate; Tengerite-(Y)), Th(Ca,Ce)(CO$_3$)$_2$F$_2$.3H$_2$O (Hydrated thorium calcium cerium carbonate fluoride; Thorbastnasite), BaNa$_6$Th(CO$_3$)$_6$.6H$_2$O (Hydrated barium sodium thorium carbonate; Tuliokite), Na$_2$Ce$_2$TiO$_2$(SiO$_4$)(CO$_3$)$_2$ (Sodium cerium titanium oxide silicate carbonate; Tundrite-(Ce)), Na$_3$(Nd,La)$_4$(Ti,Nb)$_2$(SiO$_4$)$_2$(CO$_3$)$_3$O$_4$(OH).2H$_2$O (Sodium neodymium lanthanum titanium niobium silicate carbonate oxide hydroxide; Tundrite-(Nd)), and other carbonate salts and hydrates, and related acids and bases forms.

Contrary to carbonate salts and minerals which release carbon dioxide upon thermal decomposition, an example for a reaction with other chemicals can be heating of an intimate mixture of powdered zinc metal and calcium carbonate, which releases carbon monoxide (CO) according to the following reaction: $Zn + CaCO_3 \rightarrow ZnO + CaO + CO_{(g)}$.

TABLE 2

Bicarbonate salts and minerals (releasing water (H$_2$O) and carbon dioxide (CO$_2$) during thermal decomposition)

| Chemical name | Other names | Chemical formula (empirical) | Related compounds |
| --- | --- | --- | --- |
| Potassium hydrogen carbonate | Potassium bicarbonate, Potassium acid carbonate, Bicarbonate of potassium, Kalicinite | KHCO$_3$ | |
| Sodium hydrogen carbonate | Sodium bicarbonate, Baking soda, Bread soda, Cooking soda, Bicarbonate of soda, Nahcolite | NaHCO$_3$ | |
| Magnesium hydrogen carbonate | Magnesium bicarbonate | MgHCO$_3$ | Mg(HCO$_3$)(OH)•2H$_2$O (Hydrated magnesium bicarbonate hydroxide; Nesquehonite) |
| Calcium hydrogen carbonate | Calcium bicarbonate | CaHCO$_3$ | |
| Rubidium hydrogen carbonate | Rubidium bicarbonate | RbHCO$_3$ | |
| Cerium hydrogen carbonate | Cerium bicarbonate | CeHCO$_3$ | |

More bicarbonate minerals that can be used according to some embodiments of the invention may include $HPb_4Cu_4Si_4O_{12}(HCO_3)_4(OH)_4Cl$ (Ashburtonite), $(Na,Ce)(Y,REE)(HCO_3)(OH)_3 \cdot 4H_2O$ (Thomasclarkite-(Y)), $Na_{25}Ba(Y,Gd,Dy)_2(HCO_3)_4(CO_3)_{11}(SO_4)_2ClF_2$ (Mineevite-(Y)), and other bicarbonate salts and hydrates, and related acids and bases forms.

TABLE 3

Nitrates and nitrite salts and minerals (releasing nitrogen dioxide ($NO_2$) and/or oxygen ($O_2$), and/or nitrogen ($N_2$) and/or water ($H_2O$) during thermal decomposition)

| Chemical name | Other names | Chemical formula (empirical) | Related compounds and remarks |
|---|---|---|---|
| Lithium nitrate | | $LiNO_3$ | $LiNO_2$ (Lithium nitrite) |
| Sodium nitrate | Nitratine, Nitratite, Nitronatrite, Soda Niter | $NaNO_3$ | $NaNO_2$ (Sodium nitrate) |
| Potassium nitrate | Niter, Nitre, Salpeter | $KNO_3$ | $KNO_2$ (Potassium nitrite) |
| Ammonium nitrate | | $NH_4NO_3$ | Decomposes to $N_2O_{(g)} + H_2O_{(g)}$, or $N_{2(g)} + H_2O_{(g)} + O_{2(g)}$ |
| Calcium nitrate | | $Ca(NO_3)_2$ | $Ca(NO_3)_2 \cdot 4H_2O$ (tetrahydrate calcium nitrate; Nitrocalcite) |
| Magnesium nitrate | | $Mg(NO_3)_2$ | $Mg(NO_3)_2 \cdot 6H_2O$ (hexahydrate magnesium nitrate), Nitromagnesite |
| Cesium nitrate | | $CsNO_3$ | |
| Rubidium nitrate | | $RbNO_3$ | |
| Copper Nitrate | | $Cu(NO_3)_2$ | $Cu_2(NO_3)(OH)_3$ (Rouaite), $Cu(NO_3)_2 \cdot 3H_2O$, $Cu(NO_3)_2 \cdot 6H_2O$ |
| beryllium dinitrate | | $Be(NO_3)_2$ | |
| Strontium nitrate | | $Sr(NO_3)_2$ | $Sr(NO_3)_2 \cdot 4H_2O$ (Strontium nitrate tetrahydrate) |
| Barium nitrate | Nitrobarite | $Ba(NO_3)_2$ | |
| Scandium nitrate | | $Sc(NO_3)_3$ | |
| Chromium nitrate | | $Cr(NO_3)_3$ | $[Cr(H_2O)_6](NO_3)_3 \cdot 3H_2O$ |
| Manganese nitrate | Manganese dinitrat | $Mn(NO_3)_2$ | $Mn(NO_3)_2 \cdot 4H_2O$ (tetrahydrate) |
| Iron nitrate | ferric nitrate | $Fe(NO_3)_3$ | $Fe(NO_3)_3 \cdot 9H_2O$ (nonahydrate), $Fe(NO_3)_3 \cdot 6H_2O$ (hexahydrate) |
| Cobalt nitrate | Cobaltous nitrate | $Co(NO_3)_2$ | $Co(NO_3)_2 \cdot nH_2O$, (n = 2, 4, 6) |
| Nickel nitrate | | $Ni(NO_3)_2$ | $Ni(NO_3)_2 \cdot 6H_2O$ (hexahydrate) |
| Palladium nitrate | | $Pd(NO_3)_2$ | |
| Silver nitrate | | $AgNO_3$ | |
| Zinc nitrate | | $Zn(NO_3)_2$ | $Zn(NO_3)_2 \cdot 6H_2O$ (hexahydrate) |
| Cadmium nitrate | | $Cd(NO_3)_2$ | $Cd(NO_3)_2 \cdot 4H_2O$ |
| Mercury nitrate | | $Hg(NO_3)_2$ | $Hgd(NO_3)_2 \cdot H_2O$ (monohydrate) |
| Aluminium nitrate | | $Al(NO_3)_3$ | $Al(NO_3)_3 \cdot 9H_2O$ |
| Lead(II) nitrate | | $Pb(NO_3)_2$ | |
| Chlorine nitrate | | $ClNO_3$ | Decompose to $Cl_{2(g)} + NO_{x(g)}$ |
| Gadolinium nitrate | | $Gd(NO_3)_3$ | |
| Uranyl nitrate | | $UO_2(NO_3)_2$ | $UO_2(NO_3)_2 \cdot nH_2O$ (n = 3, 6) |

More nitrate minerals that can be used according to some embodiments of the invention are $Cu_{19}Cl_4(NO_3)_2(OH)_{32}\cdot 2H_2O$ (Hydrated copper nitrate chloride hydroxide; Buttgenbachite), $Na_3(SO_4)(NO_3)\cdot H_2O$ (Hydrated sodium sulfate nitrate hydroxide; Darapskite), $Cu_2(NO_3)(OH)_3$ (Copper nitrate hydroxide; Gerhardtite), $Cu_3(NO_3)(OH)_5\cdot 2H_2O$ (Hydrated copper nitrate hydroxide; Likasite), $(Ni,Cu)Al_4(NO_3,SO_4)_2(OH)_{12}\cdot 3H_2O$ (Hydrated nickel copper aluminum nitrate sulfate hydroxide; Mbobomkulite), $(Ni,Cu)Al_4(NO_3,SO_4)_2(OH)_{12}\cdot 14H_2O$ (Hydrated nickel copper aluminum nitrate sulfate hydroxide; Hydrombobomkulite), $KAl_7(NO_3)_4Cl_2(OH)_{16}\cdot 8H_2O$ (Hydrated potassium aluminum nitrate chloride hydroxide; Sveite), $(NH_4,K)(NO_3)$ (Ammonium potassium nitrate; Gwihabaite), $K_3Na_7Mg_2(SO_4)_6(NO_3)_2\cdot 6H_2O$ (Humberstonite), $(Ni,Cu)Al_4[(SO_4),(NO_3)_2](OH)_{12}\cdot 3H_2O$ (Nickelalumite), $K_3Na_8Fe(SO_4)_6(NO_3)_2\cdot 6H_2O$ (Ungemachite), and other nitrate and nitrite salts and hydrates, and related acids and bases forms.

TABLE 4

Iodate and periodate salts and minerals (releasing oxygen ($O_2$) or/and iodine ($I_2$) during thermal decomposition)

| Chemical name | Other names | Chemical formula (empirical) | Related compounds |
|---|---|---|---|
| Lithium iodate | | $LiIO_3$ | |
| Sodium iodate | | $NaIO_3$ | |
| Potassium iodate | | $KIO_3$ | $KH(IO_3)_2$ (Potassium hydrogen iodate) |
| Silver iodate | | $AgIO_3$ | |
| Barium iodate | | $Ba(IO_3)_2$ | $Ba_5(IO_6)_2$ |
| Magnesium iodate | | $Mg(IO_3)_2$ | $Mg(IO_3)_2\cdot 4H_2O$, $Mg_5(IO_6)_2$ |
| Calcium iodate | Lautarite | $Ca(IO_3)_2$ | $Ca(IO_3)_2\cdot H_2O$ (Hydrated Calcium Iodate; Bruggenite) |
| Strontium iodate | | $Sr(IO_3)_2$ | |
| Nickel iodate | | $Ni(IO_3)_2$ | $Ni(IO_3)_2\cdot 2H_2O$ |
| Zinc iodate | | $Zn(IO_3)_2$ | $Zn(IO_3)_2\cdot 2H_2O$ |
| Beryllium iodate | | $Be(IO_3)_2$ | $Be(IO_4)_2$, $Be(IO_4)_2\cdot 8H_2O$, $Be_3(IO_5)_2\cdot 12H_2O$, $Be(H_4IO_6)_2\cdot 2H_2O$, $BeI_2O_8\cdot 13H_2O$ |
| Cesium periodate | | $Cs(IO_4)_2$ | |
| Copper iodate | | $Cu(IO_3)_2$ | $Cu(IO_3)(OH)$ (Copper iodate hydroxide; Salesite), $Cu_3(IO_3)_6\cdot 2H_2O$, (Hydrated copper iodate; Bellingerite) |

More iodate minerals that can be used according to some embodiments of the invention are $Pb_6(IO_3)_2Cl_4O_2(OH)_2$ (Lead iodate oxide chloride hydroxide; Schwartzembergite), $K_6(Na,K)_4Na_6Mg_{10}(SO_4)_{12}(IO_3)_{12}\cdot 12H_2O$ (Fuenzalidaite), $K_6(Na,K)_4Na_6Mg_{10}(SeO_4)_{12}(IO_3)_{12}\cdot 12H_2O$ (Carlosruizite), $Na_6CaMg(IO_3)_6(CrO_4)_2\cdot 12H_2O$ (George-ericksenite), $Ca_2(IO_3)_2(CrO_4)$ (Dietzeite), $Pb_3Cl_3(IO_3)O$ (Seeligerite), $Na_9(IO_3)(SO_4)_4$ (Hectorfloresite), and other iodate and periodate salts and hydrates, and related acids and bases forms.

TABLE 5

Bromate and perbromate salts and minerals (releasing oxygen ($O_2$) or/and bromine ($Br_2$) during thermal decomposition)

| Chemical name | Chemical formula (empirical) | Related compounds |
|---|---|---|
| Lithium bromate | $LiBrO_3$ | |
| Sodium bromate | $NaBrO_3$ | $Ba(BrO_3)_2\cdot H_2O$, $NaBrO_4$ (Sodium perbromate) |
| Potassium bromate | $KBrO_3$ | |
| Magnesium bromate | $Mg(BrO_3)_2$ | |
| Calcium bromate | $Ca(BrO_3)_2$ | |
| Strontium bromate | $Sr(BrO_3)_2$ | |
| Barium bromate | $Ba(BrO_3)_2$ | |

TABLE 5-continued

Bromate and perbromate salts and minerals (releasing oxygen ($O_2$) or/and bromine ($Br_2$) during thermal decomposition)

| Chemical name | Chemical formula (empirical) | Related compounds |
|---|---|---|
| Silver bromate | $AgBrO_3$ | |
| Cesium bromate | $CsBrO_3$ | |
| Rubidium bromate | $RbBrO_3$ | |
| Nickel bromate | $Ni(BrO_3)_2$ | |
| Zinc bromate | $Zn(BrO_3)_2$ | |
| Cadmium bromate | $Cd(BrO_3)_2$ | |
| Neodymium bromate | $Nd(BrO_3)_3$ | $Nd(BrO_3)_3\cdot 9H_2O$ |
| Praseodymium bromate | $Pr(BrO_3)_3$ | $Pr(BrO_3)_3\cdot 9H_2O$ |
| Yttrium bromate | $Y(BrO_3)_3$ | $Y(BrO_3)_3\cdot 9H_2O$ |
| Thallium bromate | $TlBrO_3$ | |

Other bromate and perbromate salts and hydrates, and related acids and bases forms may be used according some embodiments of the invention.

TABLE 6

Chlorate and perchlorate salts and minerals (releasing oxygen ($O_2$) or/and chlorine ($Cl_2$) during thermal decomposition)

| Chemical name | Chemical formula (empirical) | Related compounds and remarks |
|---|---|---|
| Potassium chlorate | $KClO_3$ | $KClO_4$ (Potassium perchlorate) |
| Sodium chlorate | $NaClO_3$ | $NaClO_4$ (Sodium perchlorate) |
| Barium chlorate | $Ba(ClO_3)_2$ | $Ba(ClO_4)_2$ (Barium perchlorate) |
| Calcium chlorate | $Ca(ClO_3)_2$ | $Ca(ClO_4)_2$ (Calcium perchlorate) |
| Ammonium chlorate | $NH_4ClO_3$ | $NH_4ClO_4$ (Ammonium perchlorate; Decomposes to $Cl_{2(g)} + N_{2(g)} + O_{2(g)} + H_2O_{(g)}$) |
| Lithium chlorate | $LiClO_3$ | $LiClO_4$ (Lithium perchlorate) |
| Magnesium chlorate | $Mg(ClO_3)_2$ | $Mg(ClO_4)_2$ (Magnesium perchlorate), $Mg(ClO_4)_2\cdot 6H_2O$ |
| Caesium chlorate | $Cs(ClO_3)_2$ | $Cs(ClO_4)_2$ (Caesium perchlorate) |
| Rubidium chlorate | $RbClO_3$ | $RbClO_4$ (Rubidium perchlorate) |
| Silver chlorate | $AgClO_3$ | $AgClO_4$ (Silver perchlorate) |
| Thallium chlorate | $TlClO_3$ | $TlClO_4$ (Thallium perchlorate) |

Other chlorate and perchlorate salts and hydrates, and related acids and bases forms may be used according to some embodiments of the invention.

Other sulfate, sulfite, dithionite and thiosulfate salts and hydrates, and related acids and bases forms may be used according to some embodiments of the invention.

TABLE 7

Manganate (III, IV, or VI), dimanganate(III), permanganate and hypomanganate salts and minerals (releasing oxygen ($O_2$) during thermal decomposition)

| Chemical name | Chemical formula (empirical) | Related compounds |
|---|---|---|
| Potassium manganate (VI) | $K_2MnO_4$ | $KMnO_4$ (Potassium permanganate), $K_3MnO_4$ (Potassium hypomanganate; Potassium manganate(V)), $K_6Mn_2O_6$ (Potassium dimanganate(III)) |
| Barium manganate (VI) | $BaMnO_4$ | $Ba(MnO_4)_2$ (Barium permanganate) |
| Calcium manganate (VI) | $CaMnO_4$ | $Ca(MnO_4)_2$ (Calcium permanganate; Acerdol), $CaMn^{IV}O_3$ (Calcium manganate (IV)) |
| Sodium manganate (VI) | $Na_2MnO_4$ | $NaMnO_4$ (Sodium permanganate), $NaMnO_4 \cdot H_2O$ (Sodium permanganate monohydrate), $NaMn^{III}O_2$ (Sodium manganate (III)) |
| Ammonium manganate (VI) | $(NH_4)_2MnO_4$ | $NH_4MnO_4$ (Ammonium permanganate; decomposes to $MnO_2$ + $N_{2(g)}$ + $H_2O_{(g)}$) |
| Silver manganate (VI) | $Ag_2MnO_4$ | $AgMnO_4$ (Silver permanganate) |
| Lithium manganate (III) | $LiMn^{III}O_2$ | $LiMn^{IV}_2O_4$ (Lithium manganate (IV)) |
| Lanthanum manganate (III) | $LaMn^{III}O_3$ | |

More manganate (III) minerals that can be used according some embodiments of the invention are $La_{1-x}Ca_xMnO_3$ (Lanthanum calcium manganate), $La_{1-x}Ba_xMnO_3$ (Lanthanum barium manganate), $(Pr,Ca)MnO3$ (Praseodymium calcium manganate), and other manganate (III, IV, or VI), dimanganate(III), permanganate and hypomanganate salts and hydrates, and related acids and bases forms.

TABLE 8

Chromate and dichromate salts and minerals (releasing oxygen ($O_2$) during thermal decomposition)

| Chemical name | Chemical formula (empirical) | Related compounds |
|---|---|---|
| Potassium chromate | $K_2CrO_4$ | $K_2Cr_2O_7$ (Potassium dichromate; Potassium bichromate; Bichromate of potash; Lopezite) |

Other chromate and dichromate salts and hydrates, and related acids and bases forms may be used according to some embodiments of the invention.

TABLE 9

Sulfate, sulfite, dithionite and thiosulfate salts and minerals (releasing sulfur dioxide ($SO_2$) during thermal decomposition)

| Chemical name | Chemical formula (empirical) | Related compounds |
|---|---|---|
| Barium sulfate | $BaSO_4$ | |
| Iron sulfate | $FeSO_4$ | $FeSO_4 \cdot H_2O$ (Szomolnokite), $FeSO_4 \cdot 4H_2O$ (Rozenite), $FeSO_4 \cdot 5H_2O$ (Siderotil), $FeSO_4 \cdot 6H_2O$ (Ferrohexahydrite), $FeSO_4 \cdot 7H_2O$ (Melanterite) |
| Copper sulfate | $CuSO_4$ | $CuSO_4 \cdot 5H_2O$ (Copper sulfate pentahydrate) |
| Sodium dithionite | $Na_2S_2O_4$ | |

TABLE 10

Cyanates and thiocyanate salts and minerals (releasing carbon dioxide ($CO_2$), nitrogen oxides (NO and/or $NO_2$), and/or sulfur dioxide ($SO_2$) during thermal decomposition)

| Chemical name | Chemical formula (empirical) | Related compounds |
|---|---|---|
| Sodium cyanate | NaOCN | NaSCN (Sodium thiocyanate) |
| Potassium cyanate | KOCN | KSCN (Potassium thiocyanate) |
| Rubidium cyanate | RbOCN | RbSCN (Rubidium thiocyanate) |
| Cesium cyanate | CsOCN | CsSCN (Cesium thiocyanate) |
| Copper cyanate | CuOCN | CuSCN (Copper thiocyanate) |
| Iron cyanate | $Fe(OCN)_2$ | $Fe(SCN)_2$ (Iron thiocyanate) |
| Silver cyanate | AgOCN | AgSCN (Silver thiocyanate) |

Other cyanate and thiocyanate salts and hydrates, and related acids and bases forms may be used according to some embodiments of the invention.

TABLE 11

Fluorides salts and minerals (releasing fluorine ($F_2$), during thermal decomposition)

| Chemical name | Chemical formula (empirical) | Related compounds |
|---|---|---|
| Copper fluoride | $CuF_2$ | |

Other fluorides salts and hydrates, and related acids and bases forms can be used according to some embodiments of the invention.

In some embodiments of the invention, the micron and/or sub-micron particles of the gas-releasing material are present at a concentration of 0.05% w/w to 10% w/w. In other embodiments of the invention, the concentration of the gas-forming material by weigh of the total frost-imparting composition is between 0.2 to 5% w/w. In some embodiments, the concentration of the gas-releasing material is between 0.2 to 0.5% w/w. In some embodiments, the gas-releasing concentration is less than 10% w/w of the total composition.

In some embodiments of the invention, the gas-forming material is $CaCO_3$. In some embodiments of the invention, the $CaCO_3$ is present at a concentration of less than 2.5% w/w. In other embodiments of the invention, the concentration of $CaCO_3$ is between 0.75 to 2.5% w/w. In other embodiments of the invention, the concentration of the $CaCO_3$ is between 1.0 to 1.8% w/w. In other embodiments of the invention, the concentration of the $CaCO_3$ is between 1.0 to 1.3% w/w.

In some embodiments, the gas-forming material is $Ca(NO_3)_2$. In some embodiments of the invention, the $Ca(NO_3)_2$ is present at a concentration of less than 2.5% w/w. In other embodiments of the invention, the concentration of $Ca(NO_3)_2$ is between 0.75 to 2.5% w/w. In other embodiments of the invention, the concentration of the $Ca(NO_3)_2$ is between 1.0 to 1.8% w/w. In other embodiments of the invention, the concentration of the $Ca(NO_3)_2$ is between 1.0 to 1.3% w/w.

Frosting optical characteristics may include, but are not limited to, light diffusing ability and/or transparency (or translucency) and/or transmittance and/or opacity properties of frosted pattern. The amount of the micron and/or sub-micron particles of the gas-forming material is adjusted in the range specified above to influence one or more of these characteristics.

It has unexpectedly founded that using micron and/or sub-micron particles of $CaCO_3$ in a concentration of less than 2.5 w/w % as the gas-releasing material provided to a glass substrate an excellent frost appearance.

Thus, in some embodiments of the invention, there is provided a frost-imparting composition comprising less than 2.5 w/w % micron and/or sub-micron particles of $CaCO_3$; a fixation agent comprising an organic component; a glass frit with or without ceramic pigments; and a liquid vehicle.

In some embodiments of the invention, the micron and/or sub-micron particles of the gas-forming material are subject to activation, i.e., to decompose or react to form gas bubbles, above a specific temperature. In some exemplary embodiments of the invention, the specific activation temperature is an inherent property of the gas-forming material. Optionally, an additive can be provided to lower the specific temperature in practice (although it should remain theoretically constant). The activation temperature of this material may vary between 400° C. to 1000° C. For example, specific activation temperatures may be, for example, 400° C., 450° C., 500° C., 550° C., 600° C., 630° C., 650° C., 700° C., 800° C., 900° C., or 1000° C. In some embodiments of the invention, the activation temperature for yielding gas bubbles is between 580 to 760° C. In other embodiments of the invention, the temperature is between 600° C. to 700° C. In some embodiments, the specific activation temperature can vary as a function of the pressure conditions and/or the additive concentration and/or the intended substrate and/or the gas-forming material.

According to some embodiments of the present invention, the frost-imparting composition may include at least one gas-forming material, which releases carbon dioxide ($CO_2$), and/or water ($H_2O$), and/or nitrogen oxides (NO and/or $NO_2$), and/or oxygen ($O_2$), and/or nitrogen ($N_2$), and/or sulfur dioxide ($SO_2$), and/or iodine ($I_2$) and/or bromine ($Br_2$), and/or chlorine ($Cl_2$), and/or fluorine ($F_2$), and/or carbon monoxide (CO), and various combination thereof following decomposition or reaction with other materials; a fixation agent comprising an organic component; a glass frit; and a liquid vehicle.

The frost-imparting composition may further comprise at least one additive, such as for example a wetting agent, a dispersing agent, a UV-curable agent, a defoamer, a humectant, a rheology control agent, an anticorrosive agent, an evaporation control agent, and an organic polymer as a fixation agent.

In some exemplary embodiments of the invention, the composition comprises a dispersing agent in a quantity sufficient to prevent particles agglomeration and phase separation. According to various exemplary embodiments of the invention, the quantity can be adjusted to prevent phase separation for 7, 14, 21, 30, 60, 90, 120, 150, 180 or 360 days or more. According to some exemplary embodiments of the invention, increased concentration of dispersing agent contributes to a longer shelf life. According to other embodiments of the invention, a shorter shelf life is accepted in order to avoid imparting undesirable characteristics to the composition by increasing the amount of the dispersing agent in the composition.

In some embodiments of the invention, the frost-imparting composition may comprise at least one dispersant or/and wetting agent. In some embodiments, the dispersant or the wetting agent is any one of DISPERBYK-163 (solution of high molecular weight block copolymer with pigment affinic groups, in xylene/butyl/acetate/methoxypropylacetate 3/1/1), BYKUMEN (solution of a lower molecular weight unsaturated acidic polycarboxylic acid polyester and white spirit/Isobutanol=2/1), SOLSPERSE 44000 (solution of active polymeric dispersant in water), EFKA-7500 (aliphatic polyether with acidic groups), BYK-358 (solution of polyacrylate copolymer and alkyl benzenes) and BYK-341 (Solution of a polyether modified polydimethylsiloxane) or any combination thereof. In some embodiments of the invention, the amount of the dispersant, based on the total weight of the frost-imparting composition, may be between 0 to 30% w/w.

In some embodiments of the invention, the composition further comprises a fixation agent to contribute to glass or the ceramic substrate adhesion. According to various exemplary embodiments of the invention, the fixation agent can include an organic polymeric material or inorganic material. The organic polymeric material is selected from acrylic resins, carboxylated acrylic resins, polyvynilpyrrolidone, polyvinylbutyral, condensate of urea and aldehydes, polyvinyl resins, cellulose acetate butyrate, and mixtures thereof. Organic polymeric fixation agents suitable for use in exemplary embodiments of the invention include, but are not limited to, polyvinylpyrolidone (PVP), polyvinylalcohol (PVA), polyethylene oxide (PEO), polyvinyl butyral (PVB), polyethylene glycols (PEG), starch, carboxymethyl cellulose (CMC), methyl cellulose, aldehyde resin, gelatin, hydroxyethyl cellulose (HEC) and hydroxypropyl cellulose (HPC). Inorganic fixation agents suitable for use in exemplary embodiments of the invention include, but are not limited to, silica nanoparticles, titania nanoparticles, zinc compound nanoparticles, and zirconia nanoparticles. In some embodiments of the invention, the organic fixation agent is LAROPAL A-81 (aldehyde resin).

In some exemplary embodiments of the invention, the organic fixation agent concentration, based on the total weight of the frost-imparting composition, is in the range of 0.1-10% w/w. Optionally, the fixation agent concentration is in the range of 0.1-2.0% w/w.

Optionally, the frost-imparting composition may include at least one organic polymeric material, which functions as a fixation agent enabling adhesion of the ink or the paste composition to the substrate prior the firing, in addition to a n inorganic component, which is the glass frit particles functioning as an enamel component.

In some embodiments of the invention, the glass frit is based on oxides chosen, for example, from silicon, lithium, potassium, calcium, aluminum, lead, zinc, bismuth, titanium, zirconium, sodium, boron, tin, vanadium, molybdenum, magnesium and other oxides. In some embodiments of the invention, the glass frit is B5317F (a bismuth-containing borosilicate glass frit).

In some embodiments of the invention, the concentration of the inorganic enamel component, which includes the glass frit particles, may be in the range of 20% w/w to 90% w/w. In some embodiments of the invention, the concentration of the glass frit is in the range of 35-75% w/w. In other embodiments of the invention, the concentration of the glass frit particles is in the range of 40-50% w/w. Further according to an embodiment of the present invention, the diameter of the glass frit particles is less than 100 micron. In some embodiments, the diameter of the glass frit particles is in less than 3000 nm. In some embodiments, in which the composition may be suitable for inkjet printing, the diameter is in the range of 100-1200 nm, optionally 100-800 nm.

According to some embodiments of the invention, the liquid carrier or liquid vehicle is an organic solvent that is selected from the group consisting of propylene glycol mono methyl ether (PM), dipropylene glycol mono methyl ether (DPM), propylene glycol mono methyl ether acetate (PMA), diethylene glycol mono butyl ether (DB), propylene glycol diacetate (PGDA), or any combination thereof.

According to other embodiments of the invention, the liquid carrier or liquid vehicle is water or a combination of water and two or more of the above organic solvents provided that the solubility of the gas-forming material in the composition of the invention is less than 20%.

According to some embodiments of the invention, the total amount of the liquid vehicle in the frost-imparting composition may range from 10 to 80 w/w %. According to other embodiments of the invention, the total amount of the liquid vehicle may range from 30 to 70 w/w %. According to other embodiments of the invention, the total amount of the liquid vehicle may range from 40 to 60 w/w %.

It may be desirable to fix the ink to the substrate before the firing so as to improve the printing properties. Addition of UV-curable agents may enable rapid fixation of the printed frosted pattern by exposing the surface-bearing ink droplets to UV radiation, after printing. The term "UV-curable agent" refers to a composition that can polymerize upon application of UV irradiation. Typically, these are photo-polymerizable monomers or oligomers, together with photo initiators and/or photosensitizers. Since the UV curable agents are organic molecules, they are burnt out during the firing of the printed glass pattern.

According to some embodiments, the UV-curable composition (monomers, oligomers, photoinitiators, photosensitizers) may be added to the composition described above, thus imparting a partial UV curing capability for the composition, which is sufficient to cause fixation of the printed droplets, immediately after exposure to UV light (or alternatively the liquid vehicle is composed of UV-curable composition).

In some embodiments of the invention, the ink frost-imparting composition of the invention may comprise a least one UV-curable monomer and/or oligomer, such as: SR-504 (ethoxylated-4-nonyl phenol acrylate), SR-355 (ditrimethylolpropane tetra acrylate), CN-550 (methoxy polyethylene glycol monomethacrylate), and any other UV-polymerizable acrylic or vinyl monomers and oligomers.

In some embodiments of the invention, the ink frost-imparting composition may comprise a least one photo-initiator and photosensitizer, such as: Luricin TPO (Diphenyl-(2,4,6-trimethylbenzoyl)-phosphine oxide), Speedcure ITX (Iso-propyl-9H-thioxanthen-9-one, 97%, mixture of 2 and 4 isomers), and any other photo-initiator and/or photosensitizer.

UV-polymerizable ink compositions can also contain UV stabilizers selected from: Hydroquinone, Methylhydroquinone, Hydroquinone bis(2-hydroxyethylen)ether, Butylated hydroxyanisole or dihydroquinone monomethyl ether, and any other UV stabilizers.

In some exemplary embodiments of the invention, the composition includes one or more pigments. The combination of pigments with micron and/or sub-micron particles of gas-forming materials in a single composition may contribute to the ability to tint frosted patterns. Tinting with a desire color can be achieved by selecting an appropriately colored pigment. Since the color must be stable at the relevant firing temperature, pigments based upon metal salts (i.e., inorganic) are suitable for use in many exemplary embodiments of the invention. For example, cobalt salts can impart a blue tint, iron oxide can impart a red tint, copper oxide or mixed oxides can impart black tints, nickel-antimony-titanium oxides can impart a yellow tint, and gold or silver salts can be used to impart a gold or silver color, respectively. According to some embodiments of the invention, the amount of the inorganic pigments, based on the total weight of the frost-imparting composition, may range from 0.1 to 25% w/w. According to other embodiments of the invention, the total amount of the inorganic pigments may range from 0.3 to 10% w/w. According to other embodiments of the invention, the total amount of the inorganic pigments may range from 0.5-5% w/w.

Further, according to embodiments of the present invention, the diameter of the inorganic pigments is less than 50 micron. In other embodiments, the diameter of the inorganic pigments is in less than 3 micron. In some embodiments, like in inkjet printing, the diameter is in the range of 100-1000 nm, and in other embodiments, the diameter is in the range of 50-700 nm.

In some exemplary embodiments of the invention, a composition as described hereinabove is used in a process selected from the group consisting of screen and/or pad and/or offset and/or flexographic and/or gravure printing, spray and/or dip and/or roller coating. In some exemplary embodiments of the invention, there is provided an ink printing cartridge containing an ink frost-imparting composition as described herein.

In some exemplary embodiments of the invention, there is provided an article of manufacture that includes: an ink frost-imparting composition also referred to in the application as frost appearance composition as described herein; packaging material; and instructions for use, the instructions specifying a temperature at which the micron and/or sub-micron particles of the gas-forming material releases gas bubbles which are used for imparting frosted glass or ceramic substrates.

In an embodiment of the invention, there is provided a frosted glass or ceramic substrate printed with a pattern or image having a frost appearance by using the composition described herein and the method and the printing process described herein. Specifically, some embodiments of the invention are based on the finding that it is possible to obtain frosted patterns on a solid substrate surface (e.g. glass) using a frost-imparting composition, which includes at least one gas-forming material, which is inactive in storage and during the printing/coating time. i.e., the material doesn't decompose or react to form gas bubbles. According to embodiments of the invention, the frost-imparting composition is an ink-jet composition, which is dispensed from an inkjet system. The composition is selectively inkjet printed onto a solid substrate surface and produces a frosted pattern thereupon when fired at a suitable temperature range.

Alternatively or additionally, some embodiments of the invention can be used in coating (e.g. screen printing) or printing processes (e.g. inkjet printing) and/or to print a pattern for imparting frosting onto a masked or unmasked surface. Alternatively or additionally, some embodiments of the invention can be used in coating or printing processes onto flat or curved, even or uneven, smooth or coarse, textured or non-textured, contoured or non-contoured glass or ceramic substrate surface.

Embodiment of the invention includes, a method of imparting a frost appearance to a solid substrate, which may be a glass or a ceramic substrate. The method may include applying a frost-imparting composition as described herein onto an unmasked solid substrate surface to form a pattern; firing the surface at the specific temperature at which a micron and/or sub-micron particles of a gas-forming material/s yield/s gas bubbles, which may be carbon dioxide ($CO_2$), and/or water ($H_2O$), and/or nitrogen oxides (NO and/or $NO_2$), and/or oxygen ($O_2$), and/or nitrogen ($N_2$), and/or sulfur dioxide ($SO_2$), and/or iodine ($I_2$) and/or bromine ($Br_2$), and/or chlorine ($Cl_2$), and/or fluorine ($F_2$), and/or carbon monoxide (CO), and various combination thereof. These gas bubbles provide the frosted pattern on the surface to obtain a white or colored foamy and opaque layer on the solid substrate which may be a glass or a ceramic substrate; cooling and removing the residual white or colored powder which accumulates on the glass or the ceramic substrate surface at the end of the firing process.

In some embodiments of the invention, the removal of the white or the colored powder layer may be performed by a moderate scrubbing process using a glass washing machine or by use of, for example, an abrasive hand pad followed by washing.

According to some embodiments of the invention, a frost-imparting composition may include a gas releasing material. The gas releasing material may include micron and/or sub-micron particles of carbonate, bicarbonate, nitrate, nitrite, iodate, periodate, bromate, perbromate, chlorate, perchlorate, fluoride, manganate, dimanganate, permanganate, hypomanganate, chromate, dichromate, sulfate, sulfite, dithionite, thiosulfate, cyanate, thiocyanate or any combination thereof. Upon heating these compound above their activation energy they would release at least one of carbon dioxide ($CO_2$), and/or water ($H_2O$), and/or nitrogen oxides (NO and/or $NO_2$), and/or oxygen ($O_2$), and/or nitrogen ($N_2$), and/or sulfur dioxide ($SO_2$), and/or iodine ($I_2$) and/or bromine ($Br_2$), and/or chlorine ($Cl_2$), and/or fluorine ($F_2$), and/or carbon monoxide (CO).

According to some embodiments of the invention, the gas-releasing material is $CaCO_3$. According to some exemplary embodiments of the invention, the $CaCO_3$ is present at a concentration of at less than 2.5% w/w.

Subsequent firing at a temperature of at least 400° C. causes the micron and/or sub-micron particles of the gas-forming material to undergo activation, i.e., to decompose or react, yielding gas such as carbon dioxide ($CO_2$), and/or water ($H_2O$), and/or nitrogen oxides (NO and/or $NO_2$), and/or oxygen ($O_2$), and/or nitrogen ($N_2$), and/or sulfur dioxide ($SO_2$), and/or iodine ($I_2$) and/or bromine ($Br_2$), and/or chlorine ($Cl_2$), and/or fluorine ($F_2$), and/or carbon monoxide (CO), and various combination thereof, which provide the frosted pattern applied on the solid substrate surface, e.g., a glass surface.

The process results in a foamy white or colored layer which is then removed by scrubbing or washing so as to result in a frosted solid substrate, e.g., frosted glass or frosted ceramic.

In some embodiments of the invention, there is provided a printing process that includes incorporating a frost-imparting composition including the micron and/or sub-micron particles of the gas-forming material into a printing apparatus; applying the composition including the gas-forming material using one of the above mentioned printing methods onto a solid substrate surface, e.g., a glass or ceramic surface; firing of the surface at a temperature of at least at 400° C. and above the activation temperature of the gas-forming material, causing it to decompose or react to yield bubbles of carbon dioxide ($CO_2$), and/or water ($H_2O$), and/or nitrogen oxides (NO and/or $NO_2$), and/or oxygen ($O_2$), and/or nitrogen ($N_2$), and/or sulfur dioxide ($SO_2$), and/or iodine ($I_2$) and/or bromine ($Br_2$), and/or chlorine ($Cl_2$), and/or fluorine ($F_2$), and/or carbon monoxide (CO), and various combination thereof, which provide the frosted pattern printed on the surface. The process results in a foamy white or colored layer, which is then removed by scrubbing or washing so as to result in a frosted imitated solid substrate, e.g., glass or ceramic.

In some embodiments of the invention, there is provided a printing process comprising incorporating a frost-imparting composition including a $CO_2$ precursor into a printing apparatus; applying the composition including the $CO_2$ precursor using one of the above mentioned printing methods onto a solid substrate surface, e.g., a glass or ceramic surface; firing of the surface at a temperature above the activation temperature of the $CO_2$ precursor, causing it to decompose and yield $CO_2$ bubbles, which provide the frosted pattern printed on the surface. The process results in a foamy white or colored layer, which is then removed by scrubbing or washing so as to result in an imitated frosted solid substrate, e.g., glass or ceramic.

In some embodiments of the invention, there is provided a printing process comprising incorporating an ink frost-imparting composition including the $CO_2$ precursor into a printing apparatus, wherein the $CO_2$ precursor is present at a concentration of less than 2.5% w/w; applying the composition including the $CO_2$ precursor onto a solid substrate surface, e.g., a glass or ceramic surface; firing of the surface at a temperature above the activation temperature of the $CO_2$ precursor, causing the it to undergo decomposing to yield $CO_2$, which provide the frosted pattern printed on the surface. The process results in a foamy white or colored layer, which is then removed by scrubbing or washing so as to result in a frosted solid substrate, e.g., glass or ceramic.

In some exemplary embodiments of the invention, there is provided a printing process comprising incorporating a ink frost-imparting composition that includes at least one gas-forming material into a printing apparatus; printing a pattern on a solid substrate, e.g., glass or ceramic, surface using the ink frost-imparting composition; firing the surface at a temperature above the activation temperature of the gas-forming material so that it undergoes activation, i.e., decomposing or reaction, to yield gas bubbles, which foam the pattern on the surface; and removing the white or colored layer formed on the surface.

Optionally, a composition according to one or more embodiments of the invention described above can be used in inkjet printing. The term "inkjet printing" as used herein refers to drop on demand inkjet printing and continuous inkjet printing.

Alternatively or additionally, a composition according to one or more embodiments of the invention described above can be used in screen and/or pad and/or offset and/or flexographic and/or gravure printing, spray and/or dip and/or roller coating.

Optionally, a particular printing method being contemplated can contribute to formulation considerations. For example, for application in drop on demand inkjet printing, an exemplary frost-imparting composition containing a micron and/or sub-micron particles of a gas-forming material might be formulated with a viscosity in the range of 10-30 cP, optionally 15-25 cP, at jetting temperature of about 30° C. Low viscosity contributes to an ability to form small droplets when exiting the nozzle, but may reduce pattern resolution by causing the spreading of the applied composition on the substrate. In some embodiments, a composition with the same micron and/or sub-micron particles of the gas-forming material formulated for continuous ink-jet printing may be formulated with a viscosity in the range of 1-10 cP, optionally 3-6 cP, at jetting temperature.

The viscosity of the frost-imparting composition can be varied by adjusting the nature and/or amount of the fixation agent and/or the inorganic enamel component and/or the dispersant and/or the liquid vehicle. According to some exemplary embodiments of the invention, adjustments in the viscosity contribute to pattern formation by affecting spreading or diffusion of an applied pattern prior to firing. Thus, according to some exemplary embodiments of the invention, a greater viscosity contributes to a higher pattern resolution and a lower viscosity contributes to a reduced pattern resolution (e.g. blurring).

Various aspects of the invention are described in greater detail in the following Examples, which represent embodiments of this invention, and are by no means to be interpreted as limiting the scope of this invention.

EXAMPLES

Reference is now made to the following examples, which together with the above description, illustrate the invention in a non limiting fashion.

Materials and Methods

The following materials were used in the formulations described in examples below:

Glass frit B5317F (bismuth-containing borosilicate frit) from Johnson Matthey;

DPM (dipropylene glycol methyl ether) from Gadot, Israel;

PGDA (propylene glycol diacetate) from Sigma-Aldrich;

DOWANOL DB (diethylene glycol butyl ether) from Dow Chemicals;

DOWANOL PM (propylene glycol methyl ether) from Dow Chemicals;

DOWANOL PMA (propylene glycol methyl ether acetate) from Dow Chemicals;

Calcium carbonate from Chemorad Chemicals;

Calcium nitrate from Sigma-Aldrich;

Pigment Black 28 (Copper Chromite Black Spinel);

Pigment Red 101 (iron oxide);

BYK-341 (solution of a polyether modified polydimethylsiloxane) from BYK-Chemie;

BYK-358 (solution of polyacrylate copolymer and alkyl benzenes) from BYK-Chemie;

Efka 7500 (aliphatic polyether with acidic groups) from BASF;

Disperbyk-163 (solution of high molecular weight block copolymer with pigment affinic groups, in xylene/butyl/acetate/methoxypropylacetate 3/1/1) from BYK-Chemie;

BYKUMEN (solution of a lower molecular weight unsaturated acidic polycarboxylic acid polyester and white spirit/isobutanol=2/1) from BYK-Chemie;

SOLSPERSE 44000 (solution of active polymeric dispersant in water) from Lubrizol;

JONCRYL 77 (acrylic polymer emulsion) from BASF;

LUCIRIN TPO (2,4,6-trimethylbenzoyldiphenylphosphine oxide) from BASF;

SPEEDCURE ITX (2-isopropyl Thioxanthone) from Lambson;

CN-550 (amine modified polyether acrylate) from Sartomer;

SR-355 (ditrimethylolpropane tetraacrylate) from Sartomer;

Screen-printing medium ST725 from Johnson Matthey, Holland;

LAROPAL A-81 (aldehyde resin) from BASF;

PVP 360 (Polyvinylpyrrolidone, average mol wt 360,000) from Sigma-Aldrich;

Unless otherwise specified, percentages (%) of ingredients are w/w (weight per weight).

Example 1

Frost-Imparting Inkjet Solvent-Based Ink Composition

In order to demonstrate the feasibility of using sub-micron particles of a carbonate salt as gas-forming material in solvent-based inkjet ink, the following formulation, set forth in table 11, was prepared.

TABLE 11

| Component | Weight percentage (%) |
| --- | --- |
| Glass frit B5317F | 32.60 |
| Calcium carbonate | 1.20 |
| DOWANOL DB | 14.30 |
| DOWANOL PM | 9.20 |
| PGDA | 6.70 |
| EFKA 7500 | 2.45 |
| LAROPAL A-81 | 1.25 |
| BYK-358 | 0.45 |
| BYK-341 | 0.01 |
| DPM | 31.84 |

This ink was prepared by mixing all the solvents, the organic fixation agent, the dispersant and the wetting agent, till a homogenous solution was obtained. The glass frit and suspension of the calcium carbonate in solvent, which was milled for three hours in a bead mill (DINO-MILL MULTI-LAB, WAB; equipped with 0.5-0.7 mm beads size), were stepwise added to the previous solution while stirring at a high shear rate (using a high shear mixer) for 30 minutes. The ink formulation was filtered through 3-micrometer filter (FSI) and then applied by an inkjet printer (Dip-Tech, model GLASSJET PRO 24 PH) onto a flat glass substrate (thickness: 4 mm) and dried at 120° C. for 10 minutes.

The printed glass substrate was heated in a furnace at a temperature range of 660-665° C. for three minutes, allowing melting and sintering of the glass frit and burning of the organic components (i.e. the solvents, the dispersants, the wetting agents, and the other polymers and surface active area materials). While the glass frit was melted to form an enamel coating layer on top of the printed glass, the $CaCO_3$ was decomposed to yield $CO_2$ bubbles, which are emitted during the firing process, resulting in a relatively foamy white and opaque layer. After cooling down the fired glass, the residual white powder which accumulated on the glass surface was removed by a moderate scrubbing process using a glass washing machine (LV-1500, POLYGLASS) or simply by use of an abrasive hand pad followed by washing the glass in water. After air drying of the glass surface, a frost appearance, resulting in a very low transparency, is obtained.

Example 2

Frost-Imparting Screen Printing Solvent-Based Ink Composition

In order to demonstrate the feasibility of using micron particles of a carbonate salt as gas-forming material in solvent-based ink for screen printing process, the following ink formulation, set forth in table 12, was prepared.

TABLE 12

| Component | Weight percentage (%) |
|---|---|
| Glass frit B5317F | 74.1 |
| Calcium carbonate | 2.5 |
| Screen-printing medium ST736 | 23.4 |

This paste formulation was prepared by blending the glass frit with the screen-printing medium. A suspension of the calcium carbonate in solvent, which was milled for three hours in a bead mill (DINO-MILL MULTI-LAB, WAB; equipped with 0.5-0.7 mm beads size), was added to the previous solution while stirring using a mixer) for 15 minutes. The ink formulation was printed onto a flat glass substrate (thickness: 4 mm) by screen printer (using a 90T polyester screen) and dried at 150° C. for 10 minutes.

The printed glass substrate was heated in a furnace at a temperature range of 660-665° C. for five minutes, allowing melting and sintering of the glass frit and burning of the organic components. While the glass frit melted to form an enamel coating layer on top of the printed glass, the $CaCO_3$ was decomposed to yield $CO_2$ bubbles, which are emitted during the firing process, resulting in a relatively foamy white and opaque layer. After cooling down the fired glass, the residual white powder which accumulated on the glass surface was removed by a moderate scrubbing process using a glass washing machine (LV-1500, POLYGLASS) or simply by use of an abrasive hand pad followed by washing the glass in water. After air drying of the glass surface, a frost appearance, resulting in a very low transparency, is obtained.

Example 3

Frost-Imparting Screen Printing Water-Based Ink Composition

In order to demonstrate the feasibility of using micron particles of a nitrate salt as gas-forming material in water-based ink for screen printing process, the following ink formulation, set forth in table 13, was prepared.

TABLE 13

| Component | Weight percentage (%) |
|---|---|
| Glass frit B5317F | 66.55 |
| Calcium nitrate | 1.25 |
| JONCRYL 77 | 16.40 |
| PVP 360 | 6.00 |
| Water | 3.40 |

TABLE 13-continued

| Component | Weight percentage (%) |
|---|---|
| SOLSPERSE 44000 | 1.20 |
| DOWANOL DB | 5.20 |

This paste formulation was prepared by blending the glass frit, the calcium nitrate, the polymer emulsion, and the solvents. This blend was thoroughly mixed and dispersed by high shear mixer for 15 minutes. The ink formulation was printed onto a flat glass substrate (thickness: 4 mm) by screen printer (using a 90T polyester screen) and dried at 130° C. for 15 minutes.

The printed glass substrate was heated in a furnace at a temperature of 670° C. for two minutes, allowing melting and sintering of the glass frit and burning of the organic components. While the glass frit melted to form an enamel coating layer on top of the printed glass, the $CaCO_3$ was decomposed to yield $CO_2$ bubbles, which are emitted during the firing process, resulting in a relatively foamy white and opaque layer. After cooling down the fired glass, the residual white powder which accumulated on the glass surface was removed by a moderate scrubbing process using a glass washing machine (LV-1500, POLYGLASS) or simply by use of an abrasive hand pad followed by washing the glass in water. After air drying of the glass surface, a frost appearance, resulting in a very low transparency, is obtained.

Example 4

Frost-Imparting UV-Curable Inkjet Solvent-Based Ink Composition

In order to demonstrate the feasibility of using sub-micron particles of a carbonate salt as gas-forming material in UV-curable inkjet ink, the following ink formulation, set forth in table 14, was prepared.

TABLE 14

| Component | Weight percentage (%) |
|---|---|
| Glass frit B5317F | 32.60 |
| Calcium carbonate | 1.20 |
| DOWANOL DB | 11.30 |
| DOWANOL PM | 9.20 |
| PGDA | 6.70 |
| EFKA-7500 | 2.40 |
| LAROPAL A-81 | 1.00 |
| BYK-358 | 0.25 |
| BYK-341 | 0.01 |
| DPM | 25.34 |
| LUCIRIN TPO | 2.50 |
| SPEEDCURE ITX | 1.00 |
| CN-550 | 4.00 |
| SR-355 | 2.50 |

This ink formulation was prepared by mixing all the solvents, the organic fixation agent, the dispersant, and the wetting agent, followed by addition of the UV additives (monomers, oligomers, and photo-initiators), till a homogenous solution was obtained. The glass frit and suspension of the calcium carbonate in solvent, which was milled for 3 hours in a bead mill (DINO-MILL MULTI-LAB, WAB; equipped with 0.5-0.7 mm beads size), were stepwise added to the previous solution while stirring at a high shear rate (using a high shear mixer) for 30 minutes. The ink formulation was filtered through 3-micrometer filter (FSI) and then applied by an R&D inkjet printer machine prototype onto a flat glass substrate (thickness: 4 mm). Immediately after the printing process the printed glass was exposed to UV light (365 nm, 400W) for 2-5 seconds thus causing rapid fixation of the inkjet ink drops on the glass substrate.

After the UV hardening process the ink was dried at 120° C. for 10 minutes, followed by heating the printed glass substrate in a furnace at a temperature range of 660-665° C. for 3 minutes. Thus allowing burning of the organic components (i.e. the solvents, the dispersants, the wetting agents, and the other monomers, polymers and surface active area materials) and melting and sintering of the glass frit. While the glass frit melted to form an enamel coating layer on top of the printed glass, the $CaCO_3$ was decomposed to yield $CO_2$ bubbles, which are emitted during the firing process, resulting in a relatively foamy white and opaque layer. After cooling down the fired glass, the residual white powder which accumulated on the glass surface was removed by a moderate scrubbing process using an abrasive hand pad followed by washing the glass in water. After air drying of the glass surface, a frost appearance, resulting in a very low transparency, is obtained.

Example 5

Colored Frost-Imparting Inkjet Solvent-Based Ink Composition

In addition to the ink formulation described in Example 1, colored formulations for providing a frost effect were also prepared, by incorporating at least one pigment into the ink compositions as described in Table 15.

TABLE 15

| Component | Weight percentage (%) |
| --- | --- |
| Pigment Black 28 (Copper Chromite Black Spinel) | 0.70 |
| Glass frit B5317F | 32.60 |
| Calcium carbonate | 1.20 |
| DOWANOL DB | 14.30 |
| DOWANOL PMA | 7.30 |
| PGDA | 6.70 |
| BYKUMEN | 1.00 |
| LAROPAL A-81 | 1.25 |
| BYK-358 | 0.45 |
| BYK-341 | 0.02 |
| DPM | 34.48 |

The ink formulation was prepared by mixing all the solvents, the organic fixation agent, the dispersant and the wetting agent, till a homogenous solution was obtained. The glass frit and suspension of the calcium carbonate in solvent were stepwise added to the previous solution followed by addition of black pigment, while stirring at a high shear rate (using a high shear mixer) for 30 minutes. The ink formulation was filtered through 3-micrometer filter (FSI) and then applied by an inkjet printer (Dip-Tech; model GlassJet PRO 24 PH) onto a flat glass substrate (thickness: 4 mm) and dried at 120° C. for 10 minutes.

The printed glass substrate was heated in a furnace at a temperature range of 660-665° C. for 3 minutes, allowing melting and sintering of the glass frit and burning of the organic components (i.e. the solvents, the dispersants, the wetting agents, and the other polymers and surface active area materials). While the glass frit melted to form an enamel coating layer on top of the printed glass, the $CaCO_3$ was decomposed to yield $CO_2$ bubbles, which are emitted during the firing process, resulting in a relatively foamy gray and opaque layer. After cooling down the fired glass, the residual gray powder which accumulated on the glass surface was removed by a moderate scrubbing process using an abrasive hand pad followed by washing the glass in water. After air drying of the glass surface, a gray tinted frost appearance, resulting in a very low transparency, is obtained.

Example 6

Colored Frost-Imparting Inkjet Solvent-Based Ink Composition

In addition to the ink formulation described in Example 6, additional colored frost-imparting ink formulation is described in Table 16.

TABLE 16

| Component | Weight percentage (%) |
| --- | --- |
| Pigment Red 101 (iron oxide) | 1.00 |
| Glass frit B5317F | 32.60 |
| Calcium carbonate | 1.20 |
| DOWANOL DB | 14.30 |
| DOWANOL PM | 9.20 |
| PGDA | 6.70 |
| EFKA-7500 | 1.00 |
| DISPERBYK-163 | 0.55 |
| LAROPAL A-81 | 1.25 |
| BYK-358 | 0.45 |
| BYK-341 | 0.01 |
| DPM | 31.74 |

The ink formulation was prepared by mixing all the solvents, the organic fixation agent, the dispersant and the wetting agent, till a homogenous solution was obtained. The glass frit and suspension of the calcium carbonate in solvent were stepwise added to the previous solution followed by addition of red pigment, while stirring at a high shear rate (using a high shear mixer) for 30 minutes. The ink formulation was filtered through 3-micrometer filter (FSI) and then applied by an inkjet printer (Dip-Tech; model GlassJet PRO 24 PH) onto a flat glass substrate (thickness: 4 mm) and dried at 120° C. for 10 minutes.

The printed glass substrate was heated in a furnace at a temperature range of 660-665° C. for three minutes, allowing melting and sintering of the glass frit and burning of the organic components (i.e. the solvents, the dispersants, the wetting agents, and the other polymers and surface active area materials). While the glass frit melted to form an enamel coating layer on top of the printed glass, the $CaCO_3$ was decomposed to yield $CO_2$ bubbles, which are emitted during the firing process, resulting in a relatively foamy pink and opaque layer. After cooling down the fired glass, the residual pink powder which accumulated on the glass surface was removed by a moderate scrubbing process using an abrasive hand pad followed by washing the glass in water. After air drying of the glass surface, a pink tinted frost appearance, resulting in a very low transparency, is obtained.

Example 7

Colored Frost-Imparting Inkjet Process by Digital Mixing

In addition to the ink formulation described in Example 6, a digital mixing process was performed by using an inkjet printer (Dip-Tech; model GlassJet PRO 24 PH) with the ink formulation of Example 1 using combination of six different commercial ceramic inks (DIP SPECTRUM, Dip-Tech). The ceramic inks which have been used are colors: Black, Red, Blue, Green, Yellow, and Orange. For each one of the colors, the digital mixing in the inkjet printer was performed by placing side by side (resolution of ca. 70 µm) small drops of the ink formulation of Example 1 and of the ceramic ink on a flat glass substrate (thickness: 4 mm).

The printed glass was dried at 120° C. for 10 minutes and heated in a furnace at a temperature range of 660-665° C. for three minutes, allowing melting and sintering of the glass frit and burning of the organic components (i.e. the solvents, the dispersants, the wetting agents, and the other polymers and surface active area materials). While the glass frit melted to form an enamel coating layer on top of the printed glass, the $CaCO_3$ was decomposed to yield $CO_2$ bubbles, which are emitted during the firing process, resulting in a relatively foamy colored and opaque layer. After cooling down the fired glass, the residual colored powder which accumulated on the glass surface was partially removed by a moderate scrubbing process using an abrasive hand pad followed by washing the glass in water. After air drying of the glass surface, a gray, red, blue, green, yellow and orange tinted frost appearance, resulting in a very low transparency, is obtained.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of producing a substrate having a frosted appearance, the method comprising:
    applying a frost-imparting composition containing at least one gas releasing material onto a ceramic substrate to receive form a coated substrate, wherein the composition comprises a liquid vehicle, 20% by weight to 90% by weight of glass frit particles and less than 10% by weight of the at least one gas releasing material, inactive below an activation temperature of at least 400° C., the gas releasing material comprising at least one of carbonate, bicarbonate, nitrate, nitrite, iodate, periodate, bromate, perbromate, fluoride, manganate, dimanganate, permanganate, hypomanganate, chromate, dichromate, sulfate, sulfite, dithionite, thiosulfate, cyanate, and thiocyanate compound; and
    firing the coated substrate at a firing temperature of above 400° C., wherein the firing temperature is chosen to be above the activation temperature of the gas-releasing material, above which the gas-releasing material yields gas bubbles and above a temperature that causes the glass frit particles to behave as a viscous liquid; and
    removing, by a scrubbing process, a powdered layer that is formed on the substrate during the firing to produce the frosted appearance of the substrate.

2. The method of claim 1, further comprising:
    prior to firing, heating the coated substrate at a temperature above the boiling point of the liquid vehicle and below the firing temperature.

3. The method of claim 1, wherein upon firing the gas releasing material releases gas bubbles of at least one of carbon dioxide ($CO_2$), water ($H_2O$), nitrogen oxides (NO and/or $NO_2$), oxygen ($O_2$), nitrogen ($N_2$), sulfur dioxide ($SO_2$), iodine ($I_2$) bromine ($Br_2$), fluorine ($F_2$), carbon monoxide (CO) and any combination thereof.

4. The method of claim 1, wherein the glass frit particles are micron or sub-micron particles.

5. The method of claim 1, wherein the at least one gas-releasing material is calcium carbonate ($CaCO_3$) and the firing temperature is between 580° C. to 760° C.

6. The method of claim 1, wherein the frost-imparting composition further comprises at least one of: a dispersing agent, a wetting agent, a UV-curable agent and an organic fixation agent.

7. The method of claim 1, wherein the composition further comprises at least one pigment.

8. The method of claim 1, wherein the substrate is glass.

9. The method of claim 1, wherein the frost-imparting composition is an ink-jet composition and applying the frost-imparting composition onto the ceramic substrate comprises dispensing the frost-imparting composition from an inkjet system.

* * * * *